US008031229B2

(12) United States Patent
Mori

(10) Patent No.: US 8,031,229 B2
(45) Date of Patent: Oct. 4, 2011

(54) IMAGING APPARATUS AND IMAGING CONTROL METHOD

(75) Inventor: Yukio Mori, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 390 days.

(21) Appl. No.: 11/876,882

(22) Filed: Oct. 23, 2007

(65) Prior Publication Data
US 2008/0094498 A1    Apr. 24, 2008

(30) Foreign Application Priority Data

Oct. 24, 2006 (JP) ................................. 2006-288538
Sep. 12, 2007 (JP) ................................. 2007-236432

(51) Int. Cl.
H04N 5/228        (2006.01)
(52) U.S. Cl. ............. 348/208.99; 348/208.1; 348/208.3; 348/208.16; 348/335
(58) Field of Classification Search .......................... None
See application file for complete search history.

(56) References Cited

U.S. PATENT DOCUMENTS

| | | | | | |
|---|---|---|---|---|---|
| 5,053,875 A | * | 10/1991 | Ishii et al. | ................ | 348/208.99 |
| 5,959,666 A | * | 9/1999 | Naganuma | ................ | 348/208.3 |
| 6,034,723 A | * | 3/2000 | Fujimori | ................ | 348/207.99 |
| 7,463,755 B2 | * | 12/2008 | Duan | ................ | 382/107 |
| 2007/0110418 A1 | | 5/2007 | Imada | | |

FOREIGN PATENT DOCUMENTS

| | | |
|---|---|---|
| JP | 07-098471 | 4/1995 |
| JP | 08-087055 | 4/1996 |
| JP | 2003-060972 | 2/2003 |
| JP | 2003060972 A * | 2/2003 |
| JP | 2006-050149 | 2/2006 |
| JP | 2006050149 A * | 2/2006 |
| JP | 2006-246354 A | 9/2006 |
| JP | 2007-139952 A | 6/2007 |

* cited by examiner

Primary Examiner — Anthony J Daniels
(74) Attorney, Agent, or Firm — Marvin A. Motsenbocker; Mots Law, PLLC

(57) ABSTRACT

The imaging apparatus includes an image sensor for obtaining a picture image from an optical image that is projected to the image sensor through an optical system, an image moving portion for moving the optical image on the image sensor, a motion detecting portion for detecting a movement on the picture image of a moving subject that appears in the optical image, and a control portion for controlling, during an exposure period after a predetermined operation, the image moving portion in the direction of canceling the movement of the moving subject on the image sensor due to a movement of the moving subject in the real space, based on a movement of the moving subject detected in advance. The control portion sets length of the exposure period based on the movement of the moving subject detected in advance.

4 Claims, 16 Drawing Sheets

NORMAL SHOOTING

MOVING SUBJECT  30 31  36  33
↑ LENS MOVEMENT

FOLLOW SHOT 215
(FIRST SUBJECT REGION)

IMAGING APPARATUS AND IMAGING CONTROL METHOD

This nonprovisional application claims priority under 35 U.S.C. §119(a) on Patent Application No. 2006-288538 filed in Japan on Oct. 24, 2006 and Patent Application No. 2007-236432 filed in Japan on Sep. 12, 2007, the entire contents of which are hereby incorporated by reference.

BACKGROUND OF THE INVENTION

1. Field of the Invention

The present invention relates to an imaging apparatus such as a digital still camera or a digital video camera, and it also relates to an imaging control method that is used by the imaging apparatus.

2. Description of Related Art

There is a special imaging technique called "follow shot" that is used for emphasizing fast speed of a vehicle or the like running in a car race or the like. Conventionally, the follow shot is performed by setting an exposure time that can generate necessary background blur in accordance with the speed of the moving subject such as a vehicle and by moving the imaging apparatus horizontally so as to pursue the moving subject. The operation of moving the imaging apparatus horizontally so as to pursue the moving subject requires much experience and professional skill.

There are various methods are proposed for obtaining the effect of the follow shot easily without such an operation. For example, one of the conventional methods detects the motion of the moving subject and changes the optical axis so as to pursue the moving subject in accordance with a result of the detection for obtaining the imaging effect of the follow shot.

Important thing in the imaging by the follow shot is the extent of blur generated in the background portion (although there is no clear definition of the extent of blur, a degree of blur of a background portion on a picture image will be referred to as a "flow blur degree" in this description). If the "flow blur degree" is too small with respect to a magnitude of a motion of the moving subject, the image expresses little speedy feeling. If the "flow blur degree" is too large, the image may become unnatural.

If the optical axis is changed so as to pursue the moving subject like the conventional method described above, the imaging effect of the follow shot will be obtained at least. However, in order to obtain a good imaging effect of the follow shot (e.g., in order to obtain a natural image with a speedy feeling), it is necessary to consider this "flow blur degree".

SUMMARY OF THE INVENTION

A first imaging apparatus according to the present invention includes an image sensor for obtaining a picture image from an optical image that is projected to the image sensor through an optical system, an image moving portion for moving the optical image on the image sensor, a motion detecting portion for detecting a movement on the picture image of a moving subject that appears in the optical image, and a control portion for controlling, during an exposure period after a predetermined operation, the image moving portion in the direction of canceling the movement of the moving subject on the image sensor due to a movement of the moving subject in a real space, based on a movement of the moving subject detected in advance. The control portion sets length of the exposure period based on the movement of the moving subject detected in advance.

For example, the control portion preferably sets the length of the exposure period based on a predetermined set value of flow blur degree and the movement of the moving subject detected in advance.

Furthermore, for example, the first imaging apparatus preferably further includes a setting portion for setting the set value of flow blur degree.

Furthermore, for example, the control portion decides automatically start timing of the exposure period based on a position of the moving subject on the picture image after the predetermined operation.

A second imaging apparatus according to the present invention includes an image sensor for obtaining a picture image from an optical image that is projected to the image sensor through an optical system, an image moving portion for moving the optical image on the image sensor, a motion detecting portion that classifies subjects appearing in the optical image into a moving subject and a background, and detects movements on the picture image of the moving subject and the background, a control portion for controlling, during an exposure period after a predetermined operation, the image moving portion in the direction of canceling the movement of the moving subject on the image sensor due to a movement of the moving subject in a real space and a movement of the imaging apparatus, based on a movement of the moving subject detected in advance. The control portion sets length of the exposure period based on the movements of the moving subject and the background detected in advance.

Furthermore, for example, the control portion sets the length of the exposure period based on a predetermined set value of flow blur degree and magnitude of a movement of the moving subject with respect to the background that is determined from the movements of the moving subject and the background detected in advance.

Furthermore, for example, the second imaging apparatus preferably further includes a setting portion for setting the set value of flow blur degree.

Furthermore, for example, the second imaging apparatus preferably further includes an image movement control permission deciding portion that decides whether or not the control portion should control the image moving portion during the exposure period, based on the picture image obtained before the start of the exposure period.

More specifically, for example, the second imaging apparatus preferably further includes an image movement control permission deciding portion that decides whether or not the control portion should control the image moving portion during the exposure period, based on a position and magnitude of the moving subject on the picture image obtained before the start of the exposure period.

Furthermore, for example, the motion detecting portion of the second imaging apparatus provides a plurality of split regions in the picture image so as to detect a movement of the image in each of the split regions, classifies the detected plurality of movements into two groups so as to classify the split regions into a region that forms the moving subject and a region that forms the background, so that the subjects appearing in the optical image are classified into the moving subject and the background.

In addition, a first imaging control method according to the present invention is an imaging control method that is used in an imaging apparatus having an image sensor for obtaining a picture image from an optical image that is projected to the image sensor through an optical system, and an image moving portion for moving the optical image on the image sensor. The method includes a motion detecting step for detecting a movement on the picture image of a moving subject that appears in the optical image, and a control step for controlling, during an exposure period after a predetermined operation, the image moving portion in the direction of canceling the movement of the moving subject on the image sensor due to a movement of the moving subject in a real space, based on a movement of the moving subject detected in advance. Length of the exposure period is set based on the movement of the moving subject detected in advance.

In addition, a second imaging control method according to the present invention is an imaging control method that is used in an imaging apparatus having an image sensor for obtaining a picture image from an optical image that is projected to the image sensor through an optical system, and an image moving portion for moving the optical image on the image sensor. The method includes a motion detecting step for classifying subjects appearing in the optical image into a moving subject and a background, and for detecting movements on the picture image of the moving subject and the background, and a control step for controlling, during an exposure period after a predetermined operation, the image moving portion in the direction of canceling the movement of the moving subject on the image sensor due to a movement of the moving subject in a real space and a movement of the imaging apparatus, based on a movement of the moving subject detected in advance. Length of the exposure period is set based on the movements of the moving subject and the background detected in advance.

BRIEF DESCRIPTION OF THE DRAWINGS

FIGS. 23A and 23B are diagrams showing a criteria region for automatic decision of the follow shot according to the second embodiment of the present invention.

DETAILED DESCRIPTION OF THE PREFERRED EMBODIMENTS

Figure 1:
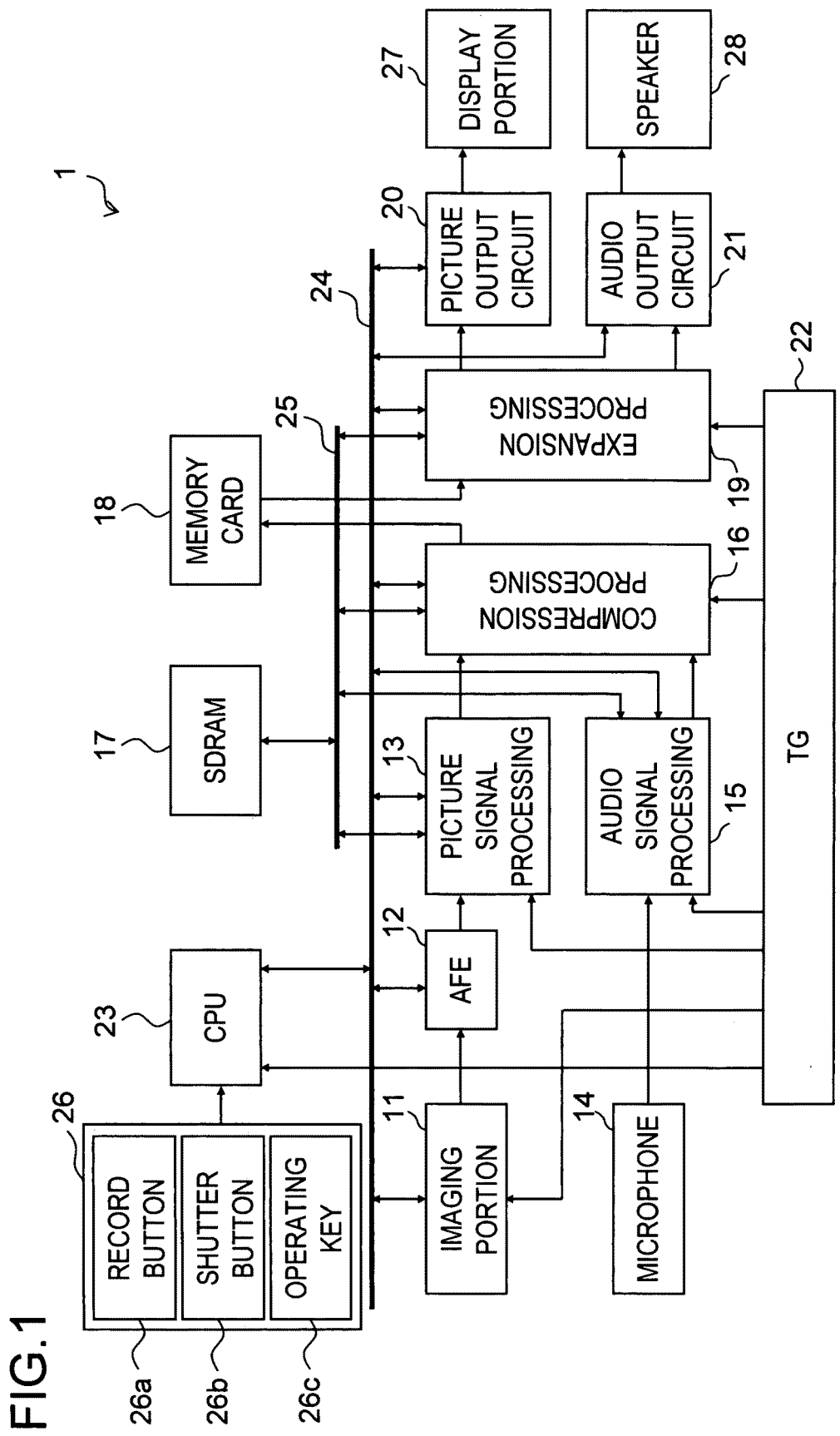
FIG. 1 is a general block diagram of an imaging apparatus according to an embodiment of the present invention.

Hereinafter, embodiments of the present invention will be described concretely with reference to the attached drawings. In the drawings that are referred to, the same parts are denoted by the same references so that overlapping description for the same part will be omitted as a general rule.

First Embodiment

First, a first embodiment of the present invention will be described. FIG. 1 is a general block diagram of an imaging apparatus 1 according to an embodiment of the present invention. The imaging apparatus 1 is a digital video camera, for example. The imaging apparatus 1 is capable of obtaining moving pictures and still pictures. It is also capable of shooting a still picture while shooting a moving picture simultaneously.

The imaging apparatus 1 includes an imaging portion 11, an AFE (Analog Front End) 12, a picture signal processing portion 13, a microphone 14, an audio signal processing portion 15, a compression processing portion 16, an SDRAM (Synchronous Dynamic Random Access Memory) 17 as an example of an internal memory, a memory card (memory portion) 18, an expansion processing portion 19, a picture output circuit 20, an audio output circuit 21, a TG (timing generator) 22, a CPU (Central Processing Unit) 23, a bus 24, a bus 25, an operating portion 26, a display portion 27 and a speaker 28. The operating portion 26 has a record button 26a, a shutter button 26b, an operating key 26c and the like. Individual portions of the imaging apparatus 1 send and receive signals (data) via the bus 24 or 25 with each other.

First, fundamental functions of the imaging apparatus 1 and the individual portions constituting the imaging apparatus 1 will be described.

The TG 22 generates timing control signals for controlling timings of the operations of the whole imaging apparatus 1 and supplies the generated timing control signals to individual portions in the imaging apparatus 1. More specifically, the timing control signals are supplied to the imaging portion 11, the picture signal processing portion 13, the audio signal processing portion 15, the compression processing portion 16, the expansion processing portion 19 and the CPU 23. The timing control signals include a vertical synchronizing signal Vsync and a horizontal synchronizing signal Hsync.

The CPU 23 controls operations of individual portions in the imaging apparatus 1 in a centralized manner. The operating portion 26 receives operations by a user. Contents of operations received by the operating portion 26 are sent to the CPU 23. The SDRAM 17 works as a frame memory. The individual portions in the imaging apparatus 1 record various data (digital signals) in the SDRAM 17 temporarily when the signals are processed, if necessary.

The memory card 18 is an external recording medium, and it is an SD (Secure Digital) memory card, for example. Although the memory card 18 is exemplified as the external recording medium in the present embodiment, the external recording medium can be one or more random access recording media (a semiconductor memory, a memory card, an optical disc, a magnetic disk and the like).

Figure 2:
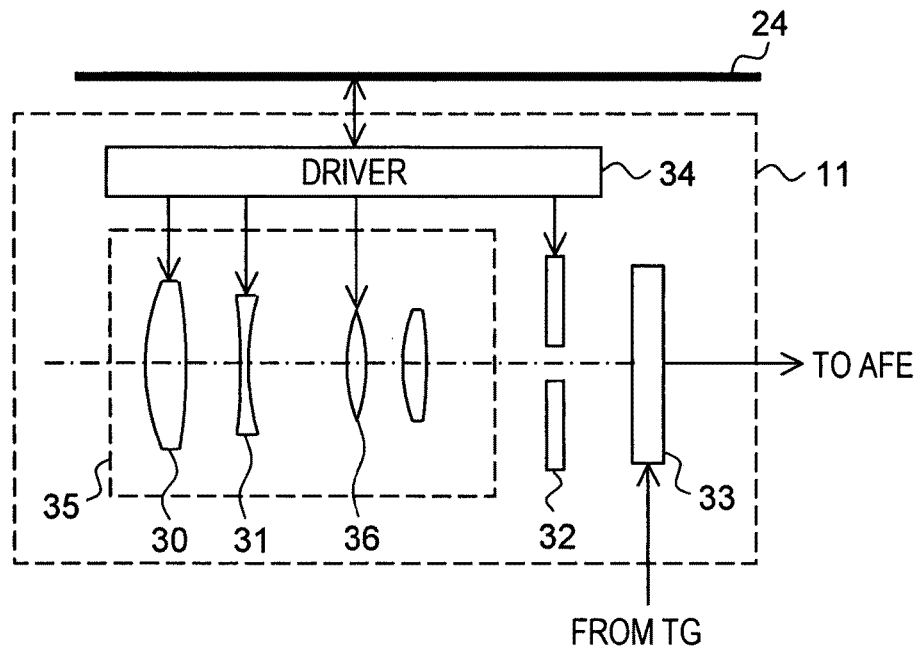
FIG. 2 is a diagram of an inner structure of an imaging portion shown in FIG. 1.

FIG. 2 is a diagram showing an inner structure of the imaging portion 11 shown in FIG. 1. The imaging apparatus 1 includes an imaging portion 11 with a color filter or the like so that a color image can be obtained by shooting.

The imaging portion 11 has an optical system 35, an iris 32, an image sensor 33 and a driver 34. The optical system 35 is equipped with a plurality of lenses including a zoom lens 30, a focus lens 31 and a correcting lens 36. The zoom lens 30 and the focus lens 31 can be moved in the optical axis direction, and the correcting lens 36 can be moved in the direction having an inclination with respect to the optical axis. More specifically, the correcting lens 36 is disposed in the optical system 35 so that it can move on a two-dimensional plane that is perpendicular to the optical axis.

The driver 34 controls movements of the zoom lens 30 and the focus lens 31 based on a control signal from the CPU 23 so as to control the zoom magnification and focal length of the optical system 35. In addition, the driver 34 controls aperture size (size of the aperture) of the iris 32 based on a control signal from the CPU 23. If an optical image entering the optical system 35 is the same, intensity of incident light entering the image sensor 33 per unit time increases as the aperture size of the iris 32 increases. A function of the correcting lens 36 and an operation of the imaging apparatus 1 utilizing the function will be described later.

The incident light from a subject enters the image sensor 33 via the lenses and the iris 32 that constitute the optical system 35. The lenses of the optical system 35 form an optical image of the subject on the image sensor 33. The TG 22 generates a driving pulse for driving the image sensor 33 in synchronization with the timing control signal described above and supplies the driving pulse to the image sensor 33.

The image sensor 33 is made up of a CCD (Charge Coupled Devices), a CMOS (Complementary Metal Oxide Semiconductor) image sensor or the like, for example. The image sensor 33 performs photoelectric conversion of the optical image entering via the optical system 35 and the iris 32 and delivers an electric signal obtained by the photoelectric conversion to the AFE 12. More specifically, the image sensor 33 includes a plurality of pixels (light receiving pixels, not shown) arranged in the two-dimensional manner like a matrix, and each pixel stores signal charge of charge quantity corresponding to exposure time in each shooting. An electric signal from each pixel having a level proportional to the charge quantity of the stored signal charge is delivered sequentially to the following AFE 12 in accordance with the driving pulse from the TG 22. If the optical image entering the optical system 35 is the same and if the aperture size of the iris 32 is the same, the level (intensity) of the electric signal from the image sensor 33 (each pixel) increases proportionally to the exposure time described above.

The AFE 12 amplifies an analog signal delivered from the imaging portion 11 (image sensor 33) and converts the amplified analog signal into a digital signal. The AFE 12 delivers the digital signal to the picture signal processing portion 13 sequentially.

The picture signal processing portion 13 generates a picture signal indicating the image obtained by the imaging portion 11 (hereinafter also referred to as a "picture image") based on an output signal of the AFE 12. The picture signal is made up of a luminance signal Y indicating luminance of the picture image and a color difference signal U and V indicating colors of the picture image. The picture signal generated by the picture signal processing portion 13 is sent to the compression processing portion 16 and the picture output circuit 20.

Figure 3:
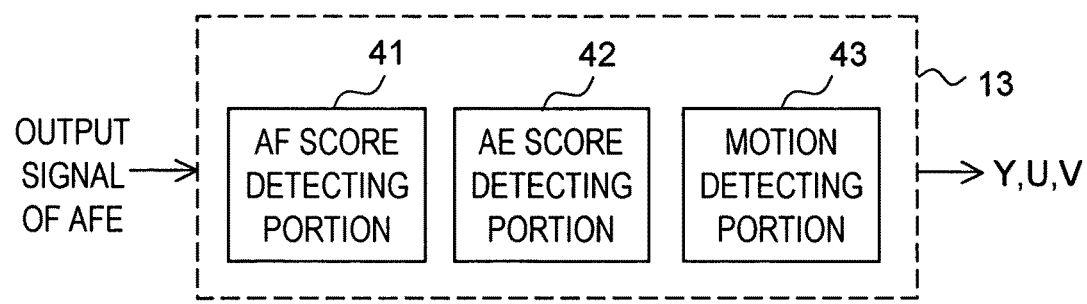
FIG. 3 is an inner block diagram of a picture signal processing portion shown in FIG. 1.

FIG. 3 shows an inner block diagram of the picture signal processing portion 13. The picture signal processing portion 13 includes an AF score detecting portion 41 that detects an AF score corresponding to a contrast level in a focus detection region in the picture image, an AE score detecting portion 42 that detects an AE score corresponding to a brightness of the picture image, a motion detecting portion 43 that detects a motion of an image in the picture image, and the like.

Various signals generated by the picture signal processing portion 13 including the AF score and the like are sent to the CPU 23 if necessary. The CPU 23 adjusts the position of the focus lens 31 via the driver 34 shown in FIG. 2 in accordance with the AF score, so that the optical image of the subject is formed on the image sensor 33. In addition, the CPU 23 adjusts the aperture size of the iris 32 via the driver 34 shown in FIG. 2 (as well as the amplification degree of the signal amplification in the AFE 12 if necessary) in accordance with the AE score, so that light reception quantity (brightness of the image) is controlled.

In FIG. 1, the microphone 14 converts sounds given externally into an analog electric signal and delivers the signal. The audio signal processing portion 15 converts the electric signal (audio analog signal) delivered from the microphone 14 into a digital signal. The digital signal obtained by this conversion is sent to the compression processing portion 16 as the audio signal indicating sounds entered the microphone 14.

The compression processing portion 16 compresses the picture signal from the picture signal processing portion 13 by using a predetermined compression method. When a moving picture or a still picture is shot, the compressed picture signal is sent to the memory card 18. In addition, the compression processing portion 16 compresses the audio signal from the audio signal processing portion 15 by using a predetermined compression method. When a moving picture is shot, the picture signal from the picture signal processing portion 13 and the audio signal from the audio signal processing portion 15 are made to have a relation with each other in a temporal manner and are compressed by the compression processing portion 16, and the signals after the compression are sent to the memory card 18.

The record button 26a is a push button switch for a user to instruct start and end of shooting a moving picture (moving image), and the shutter button 26b is a push button switch for a user to instruct exposure of shooting a still picture (still image). When the record button 26a is operated, shooting of a moving picture is started or finished. When the shutter button 26b is operated, shooting of the still picture is performed. One picture image (frame image) is obtained by one frame. The length of each frame is 1/60 seconds, for example. In this case, a set of frame images obtained sequentially at the frame period of 1/60 seconds (stream image) constitutes the moving picture.

The operating modes of the imaging apparatus 1 include an imaging mode in which moving pictures and still pictures can be shot and a reproduction mode in which moving pictures or still pictures stored in the memory card 18 can be reproduced and displayed on the display portion 27. When the operating key 26c is operated, switching between the modes is performed.

When a user presses the record button 26a in the imaging mode, the picture signal of frames after the record button 26a is pressed and the audio signal corresponding to the picture signal are recorded on the memory card 18 sequentially via the compression processing portion 16 under control by the CPU 23. In other words, the picture image of frames together with the audio signal is stored in the memory card 18 sequentially. If the user presses the record button 26a again after the shooting of the moving picture is started, the shooting of the moving picture is finished. In other words, recording of the picture signal and the audio signal on the memory card 18 is finished, so that one shoot of the moving picture is finished.

In addition, if the user presses the shutter button 26b in the imaging mode, shooting of a still picture is performed. More specifically, the picture signal of one frame just after the shutter button 26b is pressed is recorded on the memory card 18 via the compression processing portion 16 as the picture signal indicating the still picture under control by the CPU 23.

When a predetermined operation of the operating key 26c is performed by the user in the reproduction mode, the compressed picture signal indicating the moving picture or the still picture recorded on the memory card 18 is sent to the expansion processing portion 19. The expansion processing portion 19 expands the received picture signal and sends it to the picture output circuit 20. In addition, usually in the imaging mode, the picture signal processing portion 13 is generating the picture signal sequentially regardless of whether or not the moving picture or the still picture is being shot, and the picture signal is sent to the picture output circuit 20.

The picture output circuit 20 converts the received digital picture signal into a picture signal (e.g., an analog picture signal) that can be displayed on the display portion 27 and delivers the signal. The display portion 27 is a liquid crystal display or other display device, which displays an image corresponding to the picture signal delivered from the picture output circuit 20.

In addition, when the moving picture is reproduced in the reproduction mode, the compressed audio signal corresponding to the moving picture recorded on the memory card 18 is also sent to the expansion processing portion 19. The expansion processing portion 19 expands the received audio signal and sends it to the audio output circuit 21. The audio output circuit 21 converts the received digital audio signal into an audio signal (e.g., an analog audio signal) that can be reproduced by the speaker 28 and sends the signal to the speaker 28. The speaker 28 reproduces the audio signal from the audio output circuit 21 as sounds externally.

The imaging apparatus 1 has a function of imaging by the follow shot as a characteristic function. The imaging mode includes a normal shooting mode and a follow shot imaging mode for realizing the function of imaging by the follow shot. When the operating key 26c is operated, the modes are switched in accordance with the operation. Hereinafter, an operation in the follow shot imaging mode will be described mainly.

First, a function of the motion detecting portion 43 shown in FIG. 3 that are used for realizing the function of imaging by the follow shot will be described. Each picture image is divided by the number M in the vertical direction and by the number N in the horizontal direction. Therefore, each picture image is divided into (M×N) split regions. The numbers M and N are integers of two or more. The numbers M and N may be the same or different from each other.

Figure 4:
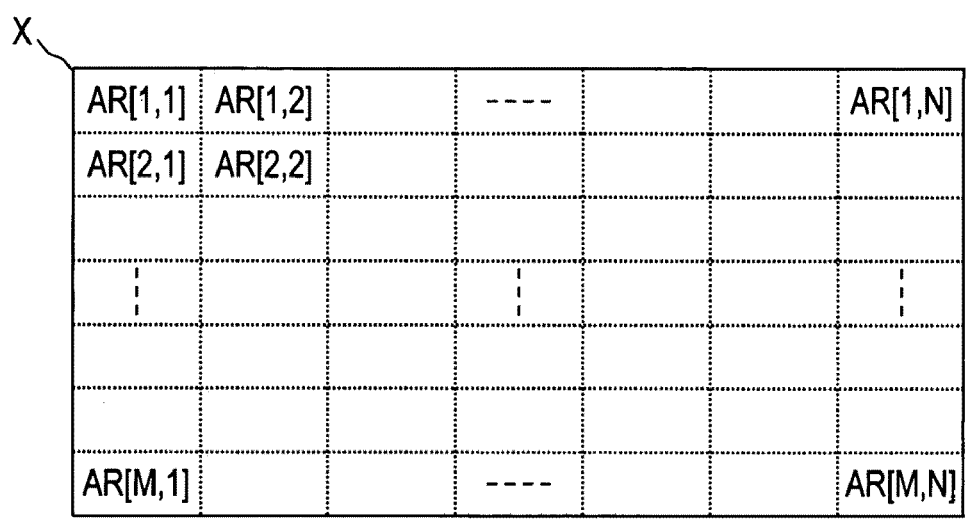
FIG. 4 is a diagram showing division of each picture image obtained from the imaging portion shown in FIG. 1.

FIG. 4 shows the division of each picture image. The (M×N) split regions are considered to be a matrix having M rows and N columns, and each of the split regions is expressed by AR[i, j] with reference to the origin X of the picture image. Here, i and j are integers that satisfy "$1 \leq i \leq M$" and "$1 \leq j \leq N$". The split region AR[i, j] having the same "i" is made of pixels on the same horizontal line, and the split region AR[i, j] having the same "j" is made of pixels on the same vertical line.

The motion detecting portion 43 detects the motion vector of each picture image for each split region AR[i, j] by comparing the picture images of neighboring frames with each other, for example, with a known or well-known image matching method (e.g., representative point matching method). The motion vector detected for each split region AR[i, j] is referred to as a regional motion vector in particular. The regional motion vector for the split region AR[i, j] specifies a level and a direction of the motion of the image in the split region AR[i, j] between picture images of the neighboring frames.

[Principle of Imaging by Follow Shot]

Next, a principle of imaging by the follow shot in accordance with the function of imaging by the follow shot will be described.

It is supposed to shoot a motorcycle that runs in front of a gas station so as to cross the same. In addition, it is supposed that the imaging apparatus 1 is fixed. The motorcycle in this case can be called a moving subject that moves relatively to the imaging apparatus 1. In contrast, a subject that does not move relatively to the imaging apparatus 1 can be called a stationary subject. In this example, the gas station or the like that is a fixed building is included in the stationary subjects. In addition, for convenience of simple description, all subjects other than the motorcycle in the shoot area are considered to be stationary with respect to the imaging apparatus 1 and are called a background in a generic manner.

Figure 5:
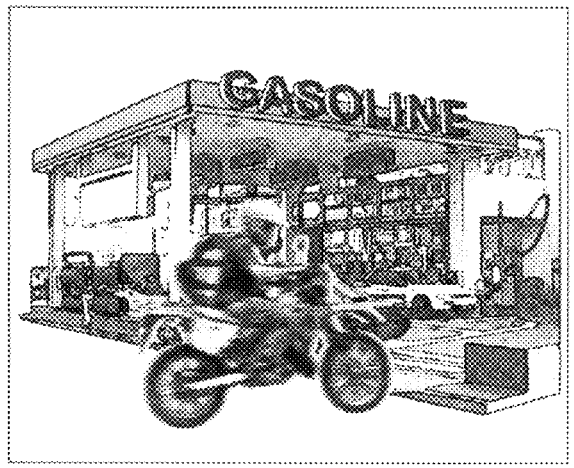
FIG. 5 is a diagram showing an image obtained by shooting a running motorcycle in a normal shooting mode.

In the normal shooting mode, the correcting lens 36 shown in FIG. 2 is basically fixed (however, movements for so-called vibration compensation are permitted). Therefore, if the motorcycle is shot in the normal shooting mode, the background portion becomes clear in the picture image while the motorcycle in the image becomes unclear with a so-called subject vibration (moving subject vibration) as shown in FIG. 5 because the motorcycle is moving during the exposure period.

Figure 6:
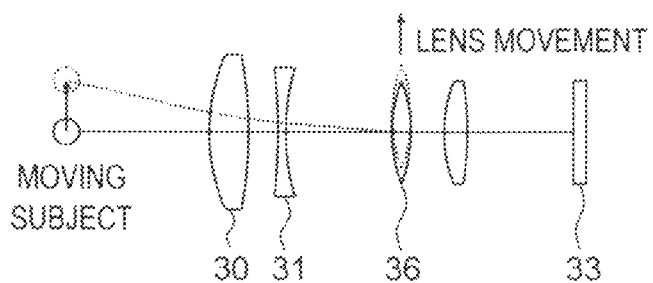
FIG. 6 is a diagram showing movement of a correcting lens shown in FIG. 2 in an exposure period for imaging by the follow shot.

On the other hand, the correcting lens 36 is moved in the follow shot imaging mode so as to pursue the moving subject. More specifically, the correcting lens 36 is moved in the optical system 35 based on the motion vector detected before the exposure period during the exposure period for the imaging by the follow shot (a follow shot exposure period that will be described later) so that a movement of the moving subject on the image sensor 33 due to a movement of the moving subject (the motorcycle in this case) on the real space can be cancelled. In other words, as shown in FIG. 6, during the exposure period for the imaging by the follow shot, the correcting lens 36 is moved gradually along with the movement of the moving subject in the real space so that the optical image showing the moving subject is always formed at the same position on the image sensor 33 by refraction of the correcting lens 36. The control of moving the correcting lens 36 as described above during the exposure period (the follow shot exposure period that will be described later) is referred to as "follow shot optical axis control", hereinafter. As a matter of course, the movement of the correcting lens 36 makes the optical axis of the optical system 35 change.

Figure 7:
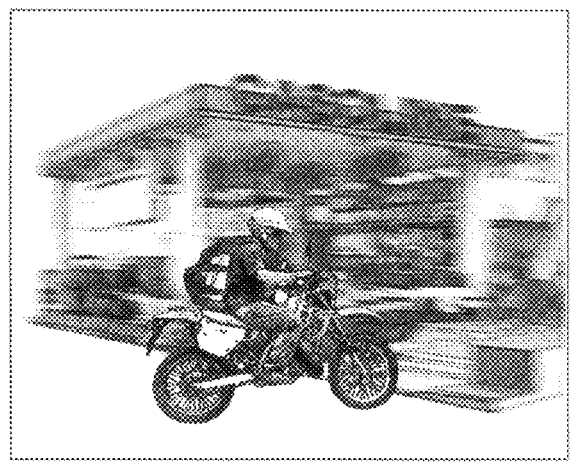
FIG. 7 is a diagram showing an image obtained by shooting a running motorcycle in a follow shot imaging mode.

According to this follow shot optical axis control, in the case where the motorcycle is shot in the follow shot imaging mode, the motorcycle is obtained clearly while the background portion becomes unclear with a subject vibration as shown in FIG. 7. In other words, the imaging effect of the follow shot is obtained. The image as shown in FIG. 7 obtained by the follow shot optical axis control is referred to as a follow shot image, in particular.

As described above, the correcting lens 36 is disposed in the optical system 35 so as to be able to move on the two-dimensional plane that is perpendicular to the optical axis. Therefore, when the correcting lens 36 moves, the optical image that is projected to the image sensor 33 moves in the two-dimensional direction that is parallel to the imaging surface of the image sensor 33 (the plane on which the pixels are arranged and to which the optical image is projected) on the image sensor 33. The movement of the correcting lens 36 is realized by the driver 34 (see FIG. 2) under control of the CPU 23.

Figure 8:
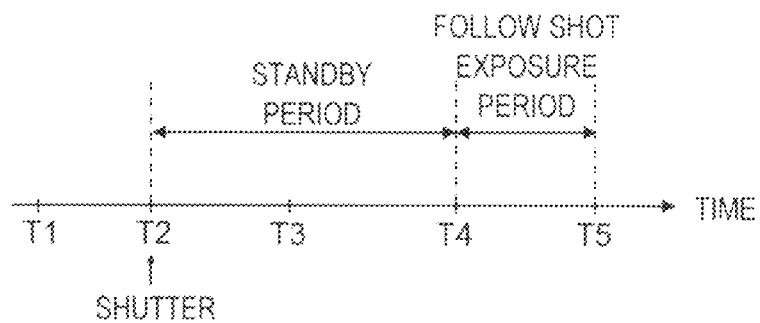
FIG. 8 is a diagram for explaining a flow of a process for obtaining a follow shot image as shown in FIG. 7 according to a first embodiment of the present invention.
Figure 9:
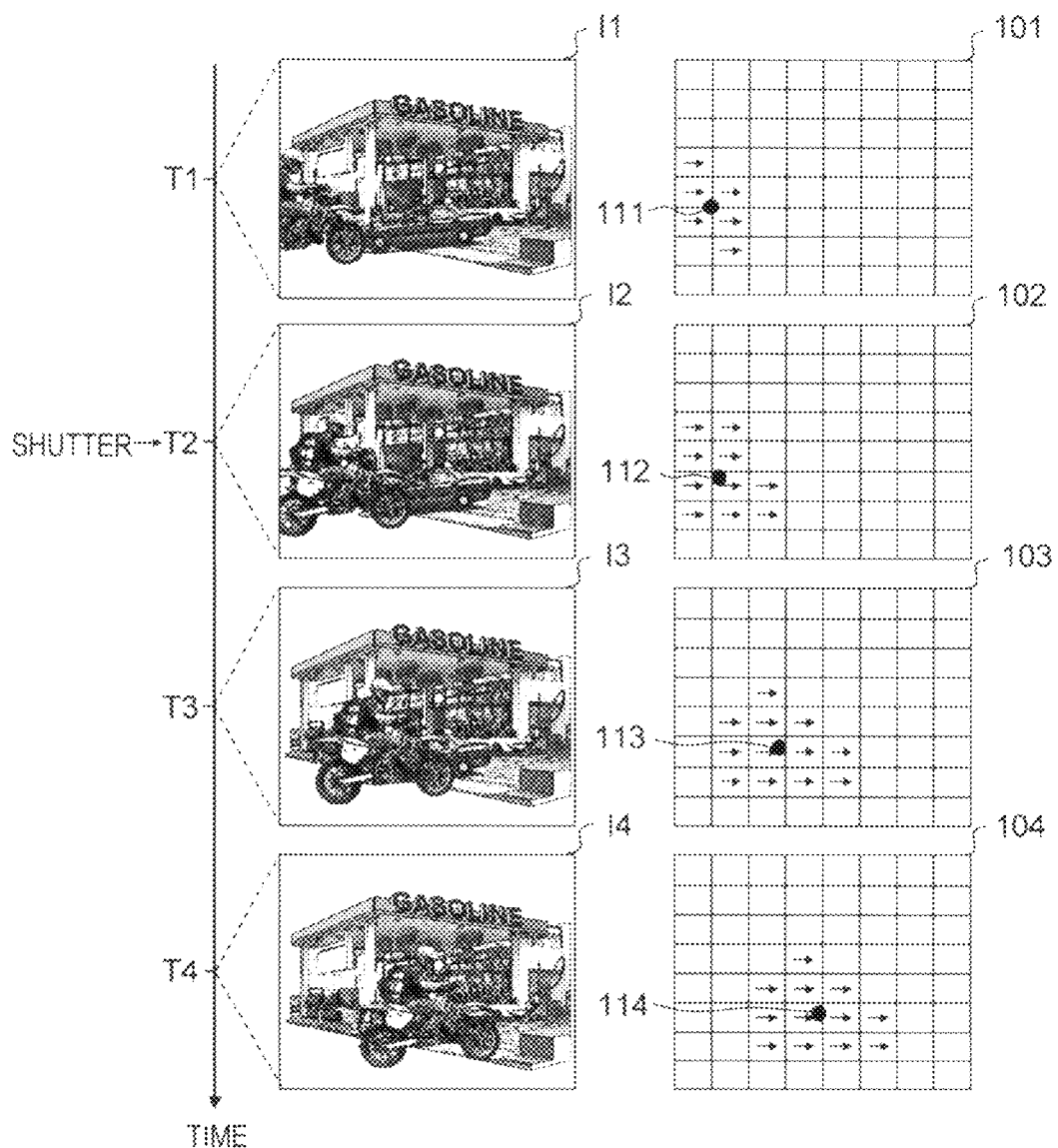
FIG. 9 is a diagram for explaining a flow of a process for obtaining a follow shot image as shown in FIG. 7 according to a first embodiment of the present invention.

With reference to FIGS. 8 and 9, a flow of a process for obtaining the follow shot image will be described. FIG. 8 is a diagram showing timings for obtaining the follow shot image shown in FIG. 7 in the follow shot imaging mode. It is supposed that time passes in the order of the timings T1, T2, T3, T4 and T5. In the imaging mode including the follow shot imaging mode, the output signal of the image sensor 33 is read out at a predetermined frame period (e.g., 1/60 seconds period) so that the picture image is obtained sequentially regardless of whether or not the shutter button 26b is pressed.

The picture images I1, I2, I3 and I4 shown on the left side in FIG. 9 indicate picture images that are obtained at the timings T1, T2, T3 and T4, respectively. The picture images (I1, I2, I3 and I4) are updated and displayed sequentially on the display portion 27. In addition, the motion vector state diagrams 101, 102, 103 and 104 shown on the right side in FIG. 9 indicate states of the regional motion vectors of the picture images I1, I2, I3 and I4, respectively. For concrete description, it is supposed that each of M and N is eight hereinafter.

The fixed imaging apparatus 1 always views the noted gas station in the shoot area, and the motorcycle enters from the left side toward the right side in the shoot area at the timing T1. Therefore, the regional motion vector corresponding to the region in which the motorcycle is positioned in the picture image I1 has the direction toward the right side.

The filled-in circle denoted by reference 111 in the motion vector state diagram 101 indicates the barycenter of the moving subject in the picture image I1 (the motorcycle in this case) that is calculated from the regional motion vectors for the picture image I1. Similarly, the barycenter 112, 113 and 114 are shown in the motion vector state diagrams 102, 103 and 104, respectively. The barycenters 112, 113 and 114 indicate barycenters of the moving subjects in the picture images I2, I3 and I4 that are calculated from the regional motion vectors for the picture images I2, I3 and I4, respectively. The method for specifying the region where the moving subject exists and the method for calculating the barycenter will be described later.

When the noted motorcycle enters the shoot area, the photographer presses the shutter button 26b at the timing T2 in order to obtain the follow shot image as shown in FIG. 7. This pressing is so-called half pressing or full pressing. This pressing does not cause an immediate exposure for shooting the follow shot image but causes transferring to a "standby state". The standby state is maintained from the timing T2 to the T4, and the period in which the standby state is maintained is called a "standby period".

When the motorcycle in the real space moves as the time passes from the timing T2 to the timing T3 and then to the timing T4, the motorcycle in the shoot area moves in the direction toward the right side. When the barycenter of the moving subject reaches approximately the middle in the horizontal direction of the picture image at the timing T4, exposure for obtaining the follow shot image is started, and the correcting lens 36 is moved so as to pursue the moving subject during the exposure period (i.e., the follow shot optical axis control described above is performed). The timing T5 indicates the end timing of the exposure. The period between the timings T4 and T5 corresponds to the exposure period for obtaining the follow shot image, which will be referred to as a "follow shot exposure period".

[Method for Specifying Moving Subject Region and Method for Calculating Barycenter]

Next, the method for specifying the region where the moving subject exists in each picture image and the method for calculating the above-mentioned barycenter will be described.

The CPU 23 refers to the regional motion vectors so as to specify the region in which the moving subject exists in each picture image (the region in which the moving subject is portrayed). The specified region is referred to as a "moving subject region".

First, the CPU 23 (or the motion detecting portion 43) performs averaging of all the regional motion vectors with respect to each of the obtained picture images so as to calculate an average motion vector (it is needless to say that one average motion vector is calculated with respect to one picture image). Then, the CPU 23 (or the motion detecting portion 43) compares the average motion vector with each of the regional motion vectors with respect to each of the obtained picture images. This comparison is performed for deciding whether or not the first moving subject region referee condition and the second moving subject region referee condition described below are satisfied with respect to each of the regional motion vectors. Thus, the regional motion vector that satisfies at least one of the first and the second moving subject region referee conditions is identified. It is decided that the moving subject region is made up of the split region (AR[i, j]) corresponding to the regional motion vector identified here.

The first moving subject region referee condition is a condition indicating that the magnitude of the difference vector between the regional motion vector and the average motion vector is 50% or more of the magnitude of the average motion vector.

The second moving subject region referee condition is a condition indicating that the magnitude of the difference vector between the regional motion vector and the average motion vector is a predetermined value or larger.

Figure 10:
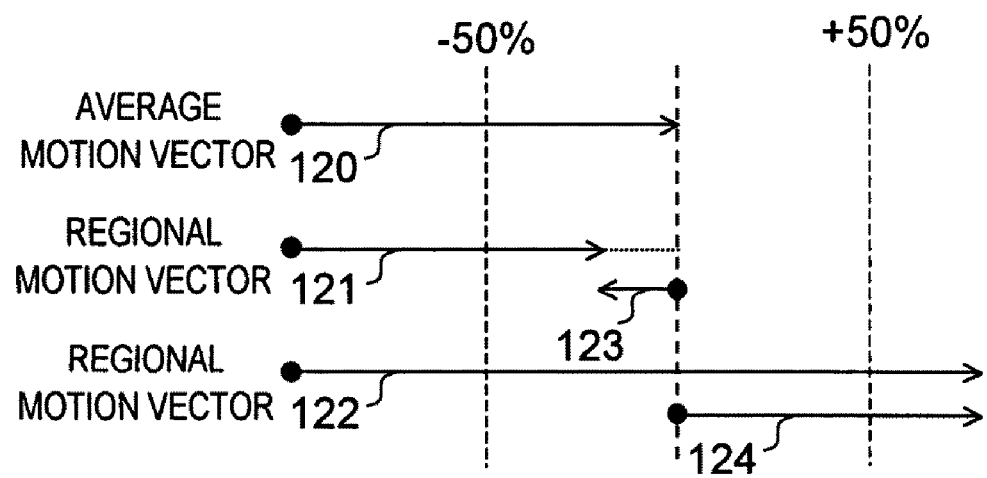
FIG. 10 is a diagram for explaining a method for specifying a moving subject region on the picture image according to the first embodiment of the present invention.

With reference to FIG. 10, a concrete example of hold or not hold of the first moving subject region referee condition will be described. When the average motion vector 120 shown in FIG. 10 is compared with the regional motion vector 121, the magnitude of the difference vector 123 between them is smaller than 50% of the magnitude of the average motion vector 120. Therefore, the regional motion vector 121 does not satisfy the first moving subject region referee condition. When the average motion vector 120 shown in FIG. 10 is compared with the regional motion vector 122, the magnitude of the difference vector 124 between them is equal to or larger than 50% of the magnitude of the average motion vector 120. Therefore, the regional motion vector 122 satisfies the first moving subject region referee condition. It is considered in the same manner with respect to the second moving subject region referee condition.

Figure 11:
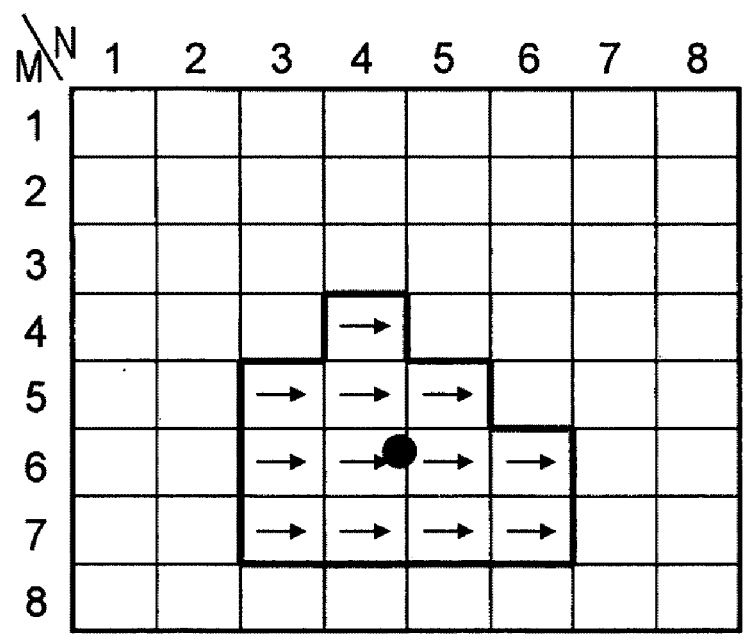
FIG. 11 is a diagram for explaining a method for calculating the barycenter of a moving subject region (a moving subject) on the picture image according to the first embodiment of the present invention.

Here, as shown in FIG. 11, it is supposed that the regional motion vectors of total twelve split regions AR[i, j] in which (i, j)=(4, 4), (5, 3), (5, 4), (5, 5), (6, 3), (6, 4), (6, 5), (6, 6), (7, 3), (7, 4), (7, 5) and (7, 6) with respect to a certain picture image satisfy the first and/or the second moving subject region referee condition and that regional motion vectors of other split regions do not satisfy the first and the second moving subject region referee conditions (note that M=N=8, as described above). In this case, the entire region including the total twelve split regions AR[i, j] (AR[4, 4] and the like) described above is specified as the moving subject region.

The barycenter of the moving subject region is calculated based on the horizontal positions and the vertical positions of the split regions that form the moving subject region on the image. The horizontal position of the barycenter of the moving subject region is considered to be the average position of the horizontal positions of the split regions that form the moving subject region, and the vertical position of the barycenter of the moving subject region is considered to be the average position of the vertical positions of the split regions that form the moving subject region. The horizontal position and the vertical position of the split region AR[i, j] are defined to be (i−0.5) and (j−0.5), respectively.

Therefore, in the case of the example shown in FIG. 11, the horizontal position of the barycenter of the moving subject becomes approximately 3.8 from the calculation "(2.5×3+3.5×4+4.5×3+5.5×2)/12≈3.8". The vertical position of the barycenter of the moving subject becomes approximately 5.4 from the calculation "(3.5×1+4.5×3+5.5×4+6.5×4)/12≈5.4".

[Exposure Condition of Imaging by Follow Shot]

Figure 12:
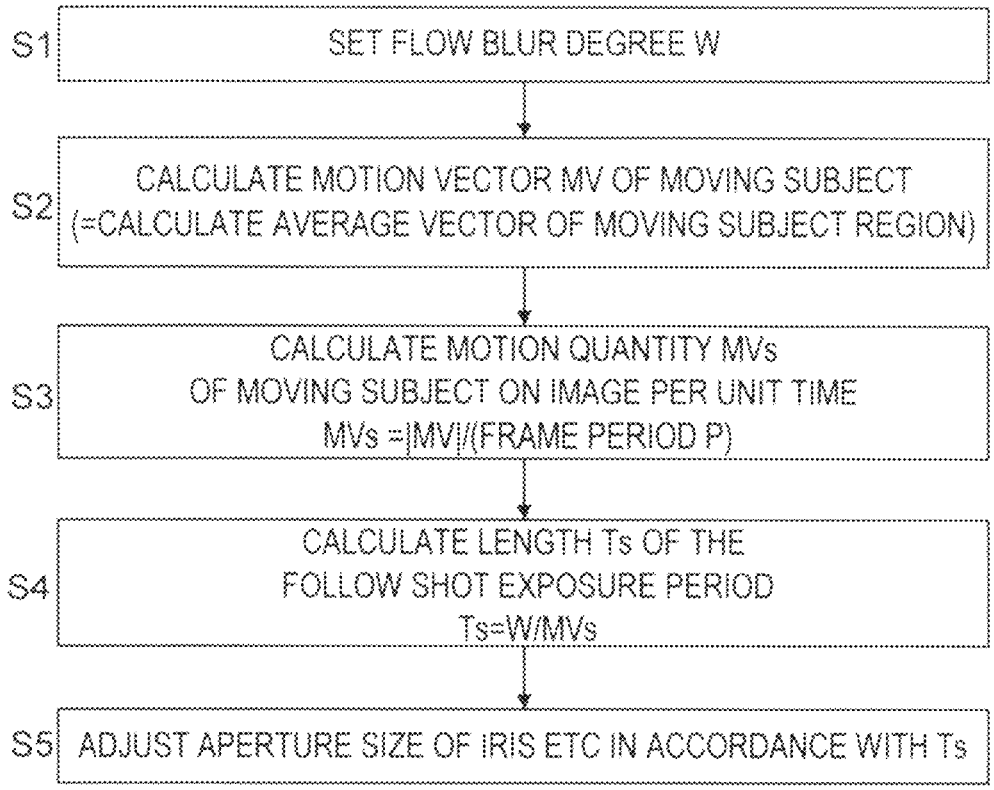
FIG. 12 is a flowchart showing a procedure of a method for setting exposure conditions or the like for obtaining the follow shot image as shown in FIG. 7 according to the first embodiment of the present invention.

Next, the method for setting the exposure condition and the like for obtaining the follow shot image will be described. FIG. 12 is a flowchart showing a procedure of this setting method.

Figure 13:
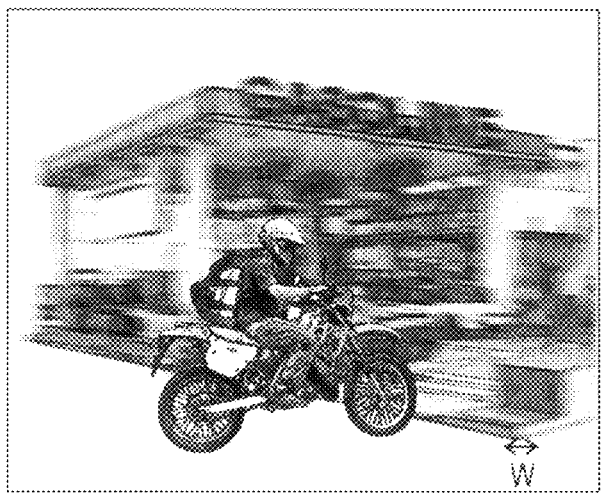
FIG. 13 is a diagram for explaining a meaning of "flow blur degree" defined by the process shown in FIG. 12.

First, in the step S1, prior to the imaging by the follow shot, a flow blur degree W is set in advance. The set flow blur degree W can also be called as a "set value of flow blur degree". The flow blur degree W indicates a degree of blur in the image of the background portion in the follow shot image obtained by the follow shot optical axis control as shown in FIG. 13, which corresponds to a distance that the same background portion moves on the image during the follow shot exposure period.

The flow blur degree W can be set to any value by a predetermined operation of the operating key 26c. In this case, the operating key 26c works as a setting portion for setting the flow blur degree W (set value of flow blur degree).

Then, in the step S2, the motion vector MV of the moving subject is calculated with respect to each picture image obtained in the standby period corresponding to the period between the timings T2 and T4 shown in FIG. 8. As for each picture image, the motion vector MV is considered to be an average vector of the regional motion vectors of the split regions that form the moving subject region. For example, concerning a certain picture image, if the moving subject region is made up of split regions [4, 2], [4, 3], [5, 2] and [5, 3], the motion vector MV of the picture image is the average vector of the total four regional motion vectors of the split regions [4, 2], [4, 3], [5, 2] and [5, 3] in the picture image.

In the next step S3, motion quantity MVs of the moving subject on the image per unit time (i.e., per one second) is calculated. The motion quantity MVs is calculated in accordance with the equation (1) below. Here, |MV| indicates the magnitude of the motion vector MV of the picture image obtained in the standby period, and P indicates a frame period in the standby period. Note that W and |MV| are defined by the unit of pixel, for example.

$$MVs = |MV|/P \quad (1)$$

The motion vector MV that is a base of the motion quantity MVs is, for example, the motion vector MV of the picture image in the frame immediately before the follow shot exposure period. However, it is possible to calculate the motion quantity MVs based on the motion vector MV of the picture image of other frame during the standby period. For example, it is possible to regard the value obtained by dividing the magnitude of the motion vector MV of the picture image two (or three or four or the like) frames before the follow shot exposure period by the frame period P to be the motion quantity MVs. Alternatively, it is possible to note a plurality of motion vectors MV of a plurality of picture images in the standby period and to regard the value obtained by dividing the magnitude of the average vector of the plurality of motion vectors MV by the frame period P to be the motion quantity MVs.

After the calculation of the motion quantity MVs, in the step S4, the length of the follow shot exposure period (i.e., the exposure time for the imaging by the follow shot) Ts is calculated in accordance with the equation (2) below.

$$Ts = W/MVs \quad (2)$$

Then in the step S5, the CPU 23 adjusts the aperture size of the iris 32 via the driver 34 in accordance with the length Ts so that the follow shot image can be obtained by an appropriate exposure. If it does not reach an appropriate exposure even if the aperture size is set to the maximum value, the amplification degree of the signal amplification in the AFE 12 is adjusted so that the brightness of the follow shot image is increased to a desired brightness. In addition, if it is decided that the brightness of the follow shot image is too high even if the aperture size of the iris 32 is set to the minimum value and the amplification degree of the signal amplification in the AFE 12 is set to the minimum value, an ND (Neutral Density) filter (not shown) is inserted so that incident light quantity of the image sensor 33 is attenuated. Note that each of the computing process in the steps S2-S4 described above is performed by the CPU 23, for example.

[General Operating Flow of Imaging by Follow Shot]

Figure 14:
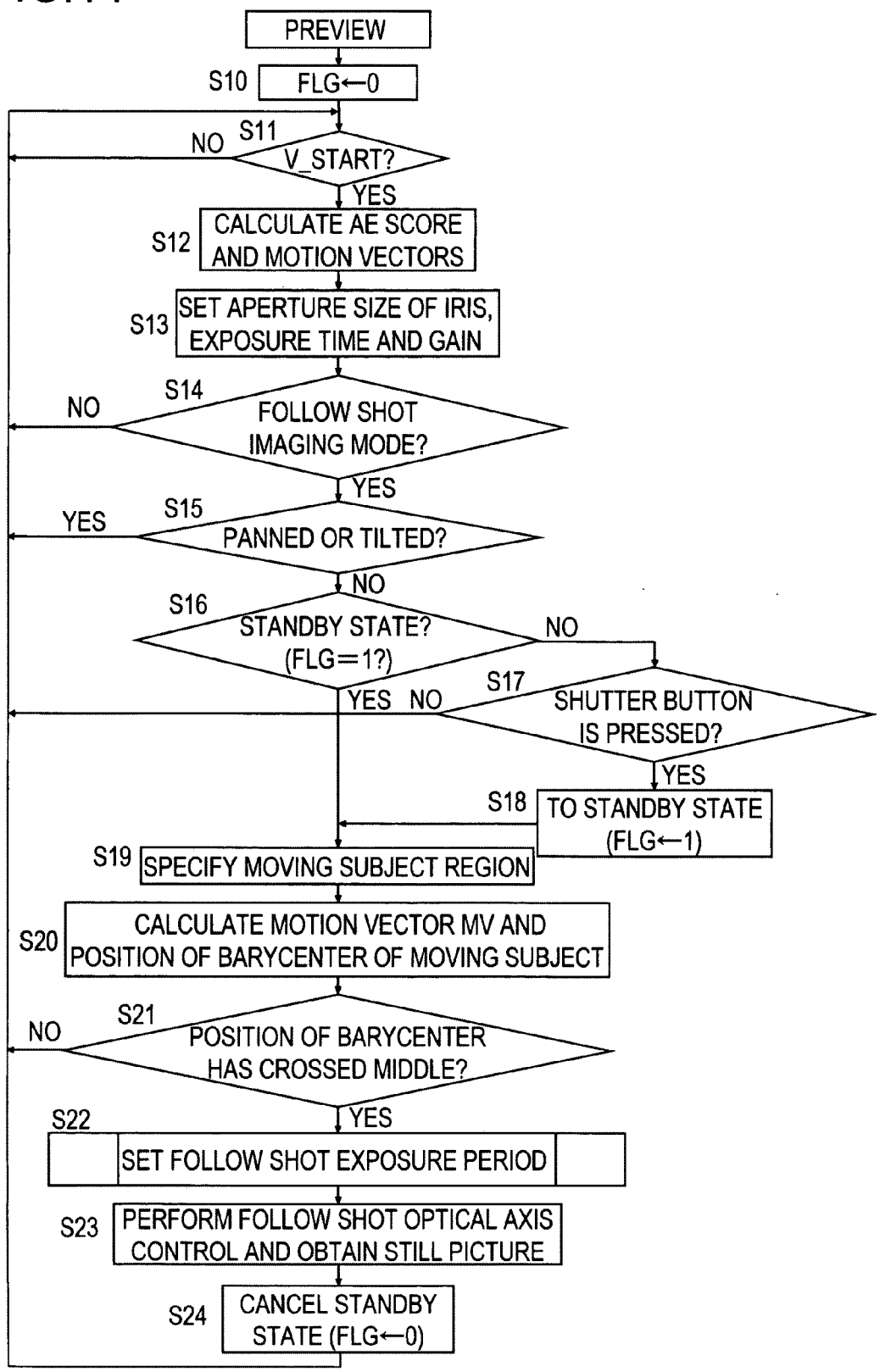
FIG. 14 is a flowchart showing an operational procedure of the imaging apparatus shown in FIG. 1 in the imaging mode in which the imaging by the follow shot is noted in particular according to the first embodiment of the present invention.

Next, the operation procedure of the imaging apparatus 1 in the imaging mode will be described by noting the imaging by the follow shot in particular. FIG. 14 is a flowchart showing this operation procedure. The contents described above are applied to the process in each step shown in FIG. 14, if necessary.

First, when the imaging apparatus 1 is powered on, or when the mode is switched from the other operating mode to the imaging mode, the process goes to a preview period in which so-called preview is performed and goes to the step S10. The preview period corresponds to a period in which an instruction of shooting based on the operation of the shutter button 26b or the record button 26a is waited while the image obtained by the image sensor 33 is displayed on the display portion 27. In this period, recording of the picture image on the memory card 18 is not performed.

In the imaging mode, a period except the shooting period of a still picture including the follow shot image or a moving picture basically belongs to the preview period, and the standby period corresponding to the period between the timings T2 and T4 shown in FIG. 8 also belongs to the preview period. The period during which the loop process including the steps S11-S17 shown in FIG. 14 is performed corresponds to the period before the timing T2 shown in FIG. 8, and the period during which the steps S19-S21 are performed without reaching the step S22 corresponds to the standby period between the timings T2 and T4 shown in FIG. 8.

Zero is substituted into a flag "flg" indicating whether or not it is the standby state in step S10, and then the process goes to the step S11.

The TG 22 generates and delivers a vertical synchronizing signal sequentially at a predetermined frame period. In the step S11 it is checked whether or not the TG 22 has delivered the vertical synchronizing signal. The vertical synchronizing signal is generated and delivered at the time point of starting each frame. In synchronization with the vertical synchronizing signal, an output signal of the image sensor 33 is read out so that the picture image is obtained sequentially. If the vertical synchronizing signal is delivered from the TG 22, the process goes to the step S12. If it is not delivered, the process of the step S11 is repeated.

In the step S12, the AE score is calculated while the regional motion vectors are calculated with respect to the latest picture image. In the step S13 following the step S12, the aperture size of the iris 32, the exposure time (i.e., length of the exposure period) and the amplification degree (gain) of the signal amplification in the AFE 12 are set based on the AE score. Then, the process goes to the step S14, where it is decided whether the imaging mode at the present time point is the follow shot imaging mode or not. If it is not the follow shot imaging mode, the process of the normal shooting mode is performed and goes back to the step S11.

If it is the follow shot imaging mode, the process goes to the step S15, where it is decided whether or not the imaging apparatus 1 is panned or tilted. If it is decided that the imaging apparatus 1 is panned or tilted, the process goes back to the step S11. Otherwise, the process goes to the step S16.

A concrete example of the step S15 will be described. First, the CPU 23 (or the motion detecting portion 43) calculates the average motion vector by averaging all the regional motion vectors with respect to the latest obtained picture image. Then, the CPU 23 (or the motion detecting portion 43) compares the average motion vector with each regional motion vector with respect to the picture image. By this comparison, it is decided whether a first pan/tilt condition and a second pan/tilt condition described below are satisfied with respect to each of the regional motion vectors. Thus, the number of regional motion vectors that satisfy at least one of the first and the second pan/tilt conditions. If the number is larger than or equal to a predetermined number (e.g., 56), the imaging apparatus 1 is decided to be panned or tilted. If it is smaller than the predetermined number, the imaging apparatus 1 is decided not to be panned or tilted. Alternatively, if a ratio of the number to the entire number of split regions (8×8=64 in this case) is larger than or equal to a predetermined ratio (e.g., 7/8), the imaging apparatus 1 is decided to be panned or tilted; and if it is smaller than the predetermined ratio, the imaging apparatus 1 is decided not to be panned or tilted.

The first pan/tilt condition is that the magnitude of the difference vector between the regional motion vector and the average motion vector is smaller than or equal to 50% of the magnitude of the average motion vector.

The second pan/tilt condition is that the magnitude of the difference vector between the regional motion vector and the average motion vector is smaller than or equal to a predetermined value.

Figure 15:
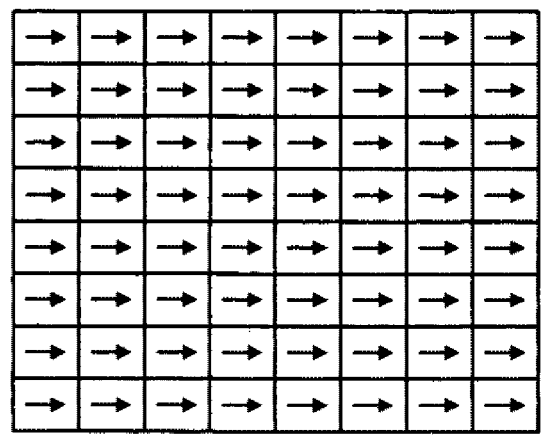
FIG. 15 is a diagram showing motion vectors in the individual regions when the imaging apparatus is moved horizontally according to the first embodiment of the present invention.

For example, when the imaging apparatus 1 is moved horizontally (when the panning operation is performed), most regional motion vectors satisfy the first and/or the second pan/tilt condition because the regional motion vectors have the same orders of magnitudes in the same direction as shown in FIG. 15.

In addition, if the imaging apparatus 1 is stationary (fixed) and if there is no moving subject in the shoot area, the magnitude of each regional motion vector becomes substantially zero. As a result, the magnitude of the average motion vector of each regional motion vector also becomes substantially zero. Therefore, if the imaging apparatus 1 is stationary and there is no moving subject in the shoot area, most regional motion vectors satisfy the second pan/tilt condition (and the first pan/tilt condition) (since the predetermined value is set appropriately). Therefore, the process is inhibited to go from the step S15 to the step S16 in this case too, so that it goes back to the step S11.

In the step S16, it is decided whether or not the current state is the standby state. If it is the standby state (i.e., if the flag "flg" is "1"), the process goes to the step S19. Otherwise, the process goes to the step S17. In the step S17, the CPU 23 checks whether the shutter button 26b is pressed or not. This pressing is so-called half pressing or full pressing. If it is pressed, the process goes to the step S18 in which "1" is substituted into the flag "flg" to be the standby state, and then the process goes to the step 59. The timing when the process of the step S18 is performed corresponds to the timing T2 shown in FIG. 8.

In the step S19, the CPU 23 refers to the regional motion vector of the latest picture image and specifies the moving subject region in the picture image in accordance with the method for specifying the moving subject region described above. In the next step S20, the motion vector MV of the moving subject corresponding to the moving subject region specified in the step S19 is calculated while a position of the barycenter of the moving subject (i.e., a horizontal position and a vertical position of the barycenter) is calculated.

Then, in the step S21, the CPU 23 checks whether or not the position of the barycenter of the moving subject calculated in the step S20 has crossed the middle (or a vicinity of the middle portion) of the image. If it is decided that the position of the barycenter of the moving subject has crossed the middle (or a vicinity of the middle portion) of the image, the process goes to the step S22. Otherwise, the process goes back to the step S11.

It is supposed for example that the moving subject is moving from the left side toward the right side in the picture image like the example shown in FIG. 9 in the standby period. In this case, if the horizontal position of the barycenter of the moving subject has passed the middle position (or a position at the vicinity of the middle position) in the horizontal direction of the picture image from the left to the right between the picture image of the present frame and the picture image of the previous frame, it is decided that the position of the barycenter of the moving subject crossed the middle (or a vicinity of the middle portion) of the image. Note that the middle position in the horizontal direction of the picture image is expressed by "4" in the present embodiment (see FIG. 11).

Although the process of the step S21 is described above by noting the movement in the horizontal direction, it is considered similarly in the case where the moving subject moves in the vertical direction.

In the step S22, the process in the steps S3, S4 and S5 shown in FIG. 12 is performed. More specifically, the motion quantity MVs of the moving subject is calculated so as to set the length of the follow shot exposure period (i.e., the exposure time for the imaging by the follow shot) Ts, and the aperture size of the iris 32 is adjusted in accordance with Ts. On this occasion, the amplification degree of the signal amplification in the AFE 12 is also adjusted, if necessary. Note that the calculation of the motion quantity MVs of the moving subject may be performed in the step S20.

After the adjustment of the aperture size of the iris 32, shooting of the still picture is performed with the exposure time Ts in the step S23, so that the follow shot image is obtained. In other words, during the follow shot exposure period, the follow shot optical axis control described above is performed based on the motion vector MV in the standby period. Here, the "motion vector MV in the standby period" is the same as the motion vector MV that is the base for the calculation of the motion quantity MVs and the exposure time Ts (see the above equations (1), (2) and the like). The follow shot image obtained by the shooting in the step S23 is recorded on the memory card 18 via the compression processing portion 16.

When the step S23 is finished, the standby state is cancelled in the step S24 (i.e., zero is substituted into the flag "flg"), and the process goes to back to the step S11.

The background portion of the follow shot image obtained by the process described above has the desired flow blur degree W as shown in FIG. 13. If this "flow blur degree" is too small, the image cannot express sufficient speedy feeling. If it is too large, the image may become unnatural. According to the present embodiment, the exposure time (the length of the follow shot exposure period) is set so that a desired flow blur degree W is obtained by referring the motion vector. Therefore, it is possible to obtain the imaging effect of the follow shot easily like a professional even by a photographer who does not have a special shooting skill.

In addition, only if the shutter operation is performed in advance, the exposure is started automatically when the moving subject comes to the middle portion or the vicinity thereof in the image. Therefore, it is possible to shoot the noted moving subject easily positioned in the middle portion or the vicinity thereof in the image.

As variations of the first embodiment described above or annotations thereof, Notes 1 to 5 will be described as follows. The contents described in each of Notes can be combined freely as long as no contradiction arises.

[Note 1]

The correcting lens 36 can be used also as an optical element for so-called vibration correction. More specifically, in the normal shooting mode, for example, the correcting lens 36 is moved in accordance with an output of an angular velocity sensor (not shown) provided to the imaging apparatus 1, so that blur in the picture image due to vibration of imaging apparatus 1 or the like can be reduced. In addition, since vibration of imaging apparatus 1 may occur during shooting in the follow shot imaging mode too, movement of the correcting lens 36 may be controlled in accordance with the output of the angular velocity sensor, so that the follow shot image is not affected by the vibration.

[Note 2]

Figure 16:
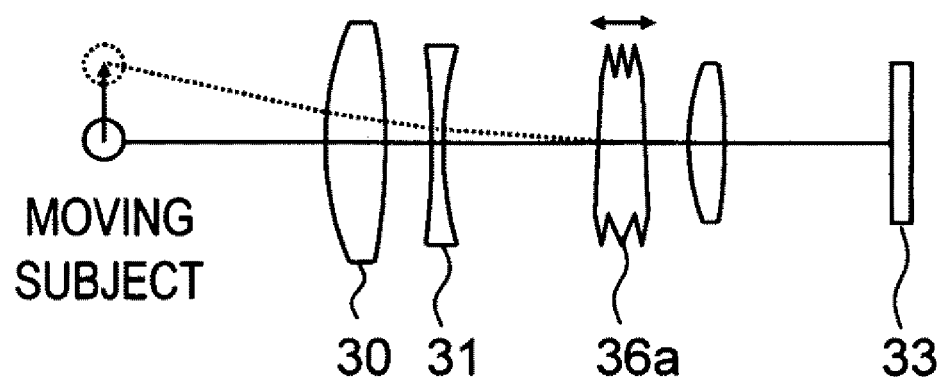
FIG. 16 is a diagram showing a variation of FIG. 6.

In addition, the correcting lens 36 described above may be replaced with a variangle prism 36a as shown in FIG. 16. The variangle prism 36a has a structure including two glass plates and liquid with high refractive index filled between the two glass plates, and it can change the refraction direction of the incident light by tilting one or both of the glass plates. The light from the subject enters the image sensor 33 through the optical system including the variangle prism 36a. In the case where the variangle prism 36a is used, the refraction direction of the variangle prism 36a should be controlled during the follow shot exposure period, based on the motion vector MV in the standby period, so that the movement of the moving subject on the image sensor 33 due to the movement of the moving subject in the real space can be cancelled. Since the variangle prism 36a is also used generally as an optical element for the vibration correction, it is possible to use the variangle prism 36a for the vibration correction.

[Note 3]

In addition, it is possible to realize the function of "canceling the movement of the moving subject on the image sensor 33 due to the movement of the moving subject in the real space during the follow shot exposure period" by the movement of the image sensor 33 in the two-dimensional direction (two-dimensional direction that is perpendicular to the optical axis). In this case, ignoring the vibration correction, there is no movement of the correcting lens 36 (or a change of the refraction direction of the variangle prism 36a) during the follow shot exposure period. The movement of the image sensor 33 in the two-dimensional direction is realized by an actuator (not shown) for example, and the CPU 23 controls the above-mentioned actuator based on the motion vector MV in the standby period. The method of moving the image sensor 33 for performing the vibration correction is known in general, and it is also possible to perform the vibration correction by moving the image sensor 33.

[Note 4]

Furthermore in the step S21, it is possible to decide whether or not the front end position of the moving subject has passed the middle (or a vicinity of the middle portion) of the image instead of the position of the barycenter of the moving subject. In this case, if the front end position has passed the middle (or a vicinity of the middle portion) of the image, the process goes to the step S22. Otherwise, the process goes to the step S11.

When the moving subject moves in the horizontal direction, the front end position of the moving subject is defined in the horizontal direction. In this case, the front end position of the moving subject is regarded to be the horizontal position of the split region positioned in the most leading direction of the moving subject among the split regions that form the moving subject region. In the case of the example shown in FIG. 11, the split region positioned in the most leading direction of the moving subject is the split regions AR[6, 6] and [7, 6]. Therefore, the front end position of the moving subject is 5.5 (=6−0.5). In this case, in the step S21, if the front end position of the moving subject has passed the middle position (or a position at the vicinity of the middle position) in the horizontal direction of the picture image from the left to the right between the picture image of the present frame and the picture image of the previous frame, it is decided that the front end position of the moving subject has crossed the middle (or a vicinity of the middle portion) of the image.

[Note 5]

In addition, the position on the image noted in the step S21 is not limited to the middle or its vicinity in the image. For example, it is possible to decide in the step S21 whether or not the position of the barycenter or the front end position of the moving subject has crossed a predetermined position on the image. In this case, if it is decided that the position of the barycenter or the front end position of the moving subject has crossed the predetermined position on the image, the process goes to the step S22. Otherwise, the process goes to the step S11. Furthermore, the predetermined position described above is preferably changeable freely by the operation of the operating key 26c.

Second Embodiment

Next, a second embodiment of the present invention will be described. A general block diagram of the imaging apparatus according to the second embodiment is the same as that shown in FIG. 1. Therefore, the imaging apparatus according to the second embodiment is also denoted by the reference numeral 1. The structures and the operations of individual portions of the imaging apparatus 1 according to the second embodiment are basically the same as those according to the first embodiment. Therefore, overlapping descriptions of the similar portions will be omitted. The descriptions in the first embodiment are applied to the second embodiment as long as no contradiction arises.

The function of imaging by the follow shot according to the first embodiment is predicated on that the imaging apparatus 1 is fixed. In the second embodiment, however, it is supposed that the photographer performs panning or tilting operation of the imaging apparatus 1 when the follow shot is performed so as to pursue the moving subject. If the panning or tilting operation is performed appropriately, a good still picture without the subject vibration of the noted moving subject can be obtained. However, it is difficult to follow the movement of the moving subject completely. The function of imaging by the follow shot according to the second embodiment compensates the portion that cannot follow with the follow shot optical axis control. The picture image obtained by using the follow shot optical axis control is called the "follow shot image" in the same manner as the first embodiment.

A flow of a process for obtaining the follow shot image will be described. It is supposed to shoot a motorcycle that runs in front of a gas station so as to cross the same. The motorcycle is a moving subject that moves in the real space, while a gas station or the like that is a fixed building is a stationary subject that is stationary in the real space. For convenience of simple description, all subjects other than the motorcycle in the shoot area are considered to be stationary in the real space, and the stationary subjects are called the background in a generic manner.

Figure 17:
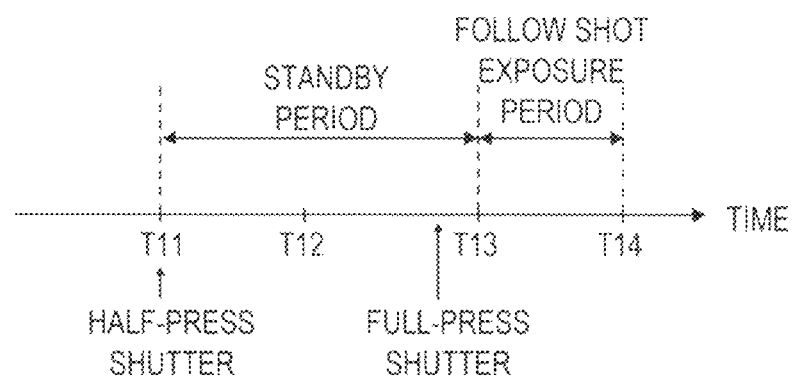
FIG. 17 is a diagram for explaining a flow of a process for obtaining a follow shot image according to a second embodiment of the present invention, which is a diagram in which a relationship between individual timings upon the imaging by the follow shot is shown in time sequence.

In FIG. 17, a relationship among timings in the imaging by the follow shot is expressed sequentially. It is supposed that time passes in the order of the timings T11, T12, T13 and T14. In the imaging mode, an output signal of the image sensor 33 is read out at a predetermined frame period (e.g., at a period of 1/60 seconds) regardless of whether the shutter button 26b is pressed or not, so that the picture image is obtained sequentially.

During the period between the timings T11 and T14, the motorcycle is moving from the left side to the right side of the imaging apparatus 1 in front of the gas station. Then, it is supposed that the photographer moves the cabinet of the imaging apparatus 1 in the right direction at an approximately constant speed so that the motorcycle is always positioned at the middle or its vicinity in the shoot area during the period between the timings T11 and T14.

Similarly to the first embodiment, the motion detecting portion 43 shown in FIG. 3 divides each of the picture images into (M×N) split regions (see FIG. 4) in the imaging mode, and the regional motion vector is calculated with respect to the split regions AR[i, j]. Hereinafter, it is supposed that "M=N=8" holds for concrete description. As shown in FIG. 4, the split region AR[1, 1] is positioned at the upper left end of the picture image, and the split region AR[8, 8] is positioned at the lower right end of the picture image. The origin X belongs to the split region AR[1, 1].

Figure 18:
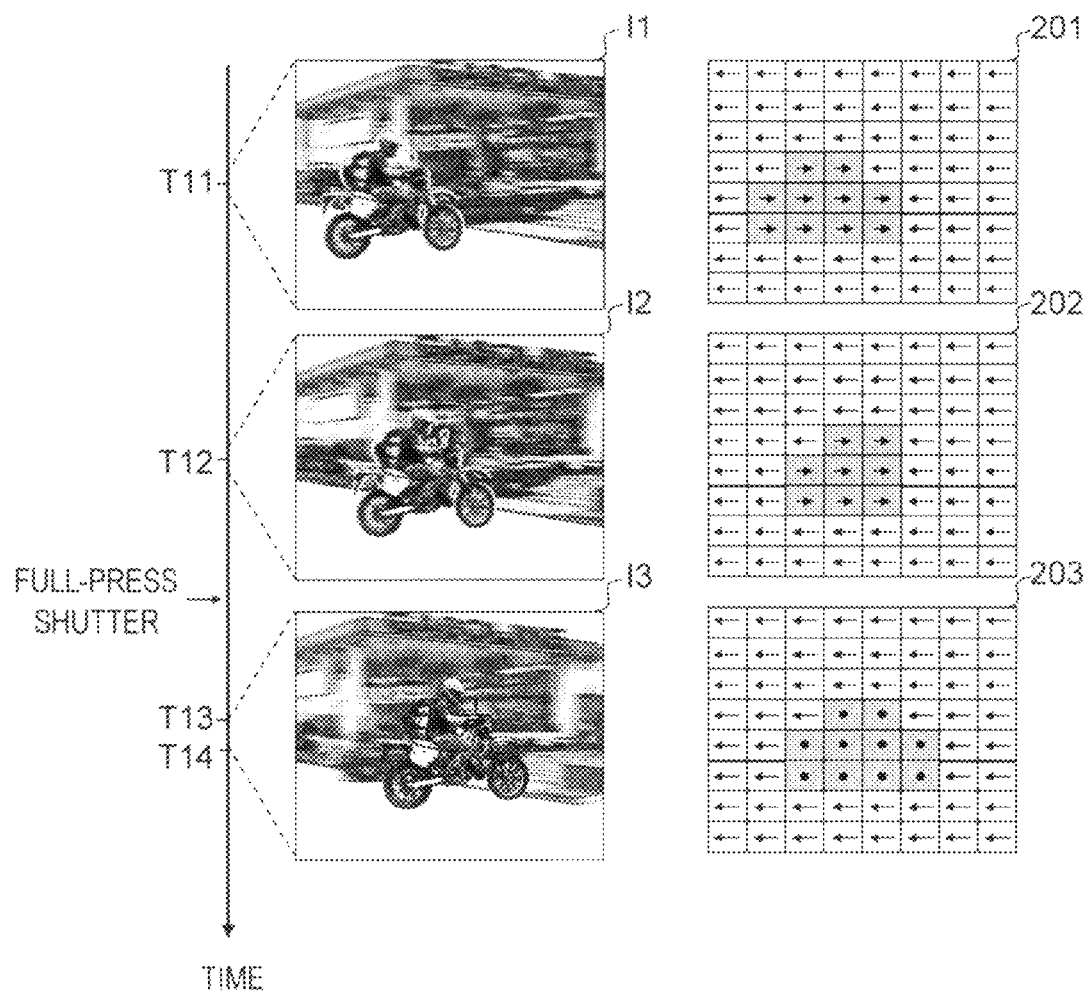
FIG. 18 is a diagram for explaining a flow of a process for obtaining the follow shot image according to the second embodiment of the present invention.

In FIG. 18, the picture images I1 and I2 indicate the picture images obtained at the time points of the timings T11 and T12, respectively. In FIG. 18, the vector group in the frame denoted by reference numeral 201 indicates movement of the image during the exposure period of the picture image I11, while the vector group in the frame denoted by reference numeral 202 indicates movement of the image during the exposure period of the picture image I12.

When the photographer presses the shutter button 26b at the timing T11, the shutter button 26b becomes the half-pressed state. The shutter button 26b can be pressed in two stages. If the photographer presses the shutter button 26b lightly, the shutter button 26b becomes the half-pressed state. If the shutter button 26b is further pressed from the half-pressed state, the shutter button 26b becomes full-pressed state (this is true for the first embodiment, too). When the shutter button 26b becomes the half-pressed state, the imaging apparatus 1 goes to the "standby state". The standby state is maintained from the timing T11 to the timing T13, and the period during which the standby state is maintained is called a "standby period". In addition, it is possible to consider the period from the timing T11 to the timing when the shutter button 26b is fully pressed as the standby period.

At the timing T11, the motorcycle is taken at the leftward position from the middle portion in the shoot area. As understood from the vector group shown in FIG. 18, direction of the movement of the image of the background portion is toward the left and the magnitude of the movement is relatively large because the cabinet of the imaging apparatus 1 is moved in the right direction. FIG. 18 shows the case of the example where the speed of moving the imaging apparatus 1 is too slow compared with the speed of the movement of the motorcycle. Because of this disagreement of the speed, the position of the motorcycle on the picture image moves in the right direction gradually while the magnitude of the movement of the image of the moving subject portion is not zero though it is relatively small during the period between the timings T11 and T13. If the still picture is obtained as it is without any correction, a blurred image of the noted motorcycle will be obtained.

After the timing T12 and just before the timing T13, the photographer will further press the shutter button 26b, and the shutter button 26b becomes the full pressed state. Then, the exposure for obtaining the follow shot image is started at the timing T13. The timing T14 indicates the end timing of this exposure. The period between the timings T13 and T14 corresponds to the exposure period for obtaining the follow shot image, which is referred to as a "follow shot exposure period".

During the follow shot exposure period, the correcting lens 36 is moved in the optical system 35 (see FIGS. 2 and 6) so that the movement of the moving subject on the image sensor 33 due to the movement of the cabinet of the imaging apparatus 1 and the movement of the moving subject (the motorcycle in this case) in the real space is cancelled. In other words, the correcting lens 36 is moved gradually so that the optical image showing the moving subject is always formed at the same position on the image sensor 33 by the refraction of the correcting lens 36 during the follow shot exposure period. This movement is performed, for example, based on the motion vector obtained from the picture image just before the timing T13 or just before the timing when the shutter button 26b becomes the full pressed state. This movement control of the correcting lens 36 is the follow shot optical axis control according to the second embodiment.

In FIG. 18, reference I13 indicates a picture image (i.e., follow shot image) obtained by the exposure period between the timings T13 and T14. Since the moving subject is stationary on the image sensor 33 while the background moves during the follow shot exposure period, subject vibration occurs only in the background portion of the picture image I13. In FIG. 18, the vector group in the frame denoted by reference numeral 203 indicates the movement of the image in the follow shot exposure period.

[Method for Classifying Moving Subject and Background]

In order to perform the follow shot optical axis control, it is necessary to recognize the position of the region where the moving subject exists in the picture image. The CPU 23 shown in FIG. 1 refers to the regional motion vectors and performs the process described below so as to specify the region where the moving subject exists (region where the moving subject is portrayed) and the region where the background exists (region where the background is portrayed) in each picture image. The specified former region is referred to as a "moving subject region", and the specified latter region is referred to as a "background region". A method for classifying the entire region of the picture image into the moving subject region and the background region will be described.

Figures 19, 20:
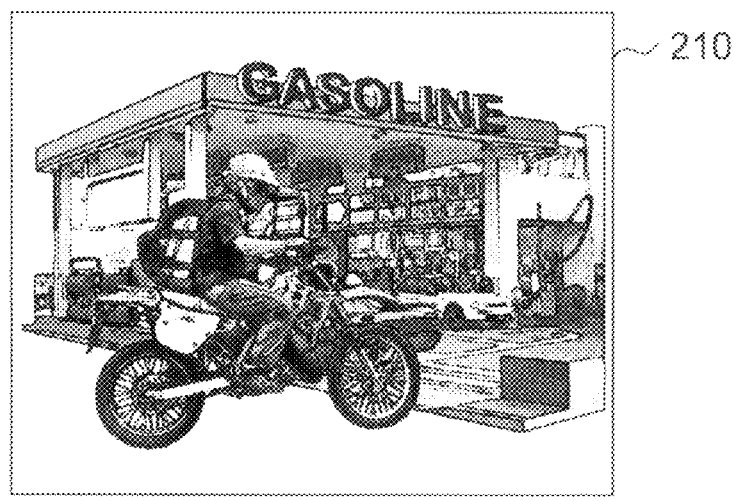
FIG. 19 is a diagram showing one picture image obtained by the shooting in a standby period according to the second embodiment of the present invention.
FIG. 20 is a diagram showing schematically a regional motion vector with respect to the picture image shown in FIG. 19.

A certain picture image obtained by the standby period shooting is noted. FIG. 19 shows a noted picture image 210. FIG. 20 is a diagram of states of regional motion vectors that shows schematically regional motion vectors of the picture image 210. The regional motion vectors of the noted picture image are obtained by comparing the noted picture image with the picture image obtained just before the noted picture image (this is true for the first embodiment, too).

It is supposed that the motorcycle as the moving subject moves in front of the gas station from the left side to the right side of the imaging apparatus 1 during the exposure period of the picture image 210 and its peripheral period, and the cabinet of the imaging apparatus 1 is moved in the right direction. In addition, the motorcycle is positioned a little left side of the middle portion in the shoot area during the exposure period of the picture image 210.

As for the picture image 210, it is supposed that the regional motion vectors of total 14 split regions AR[i, j] where (i, j)=(4, 4), (5, 3), (5, 4), (5, 5), (6, 2), (6, 3), (6, 4), (6, 5), (6, 6), (7, 2), (7, 3), (7, 4), (7, 5) and (7, 6) are the right direction, and that the regional motion vectors of other 34 split regions AR[i, j] are the left direction (see FIGS. 4 and 20).

Figure 21:
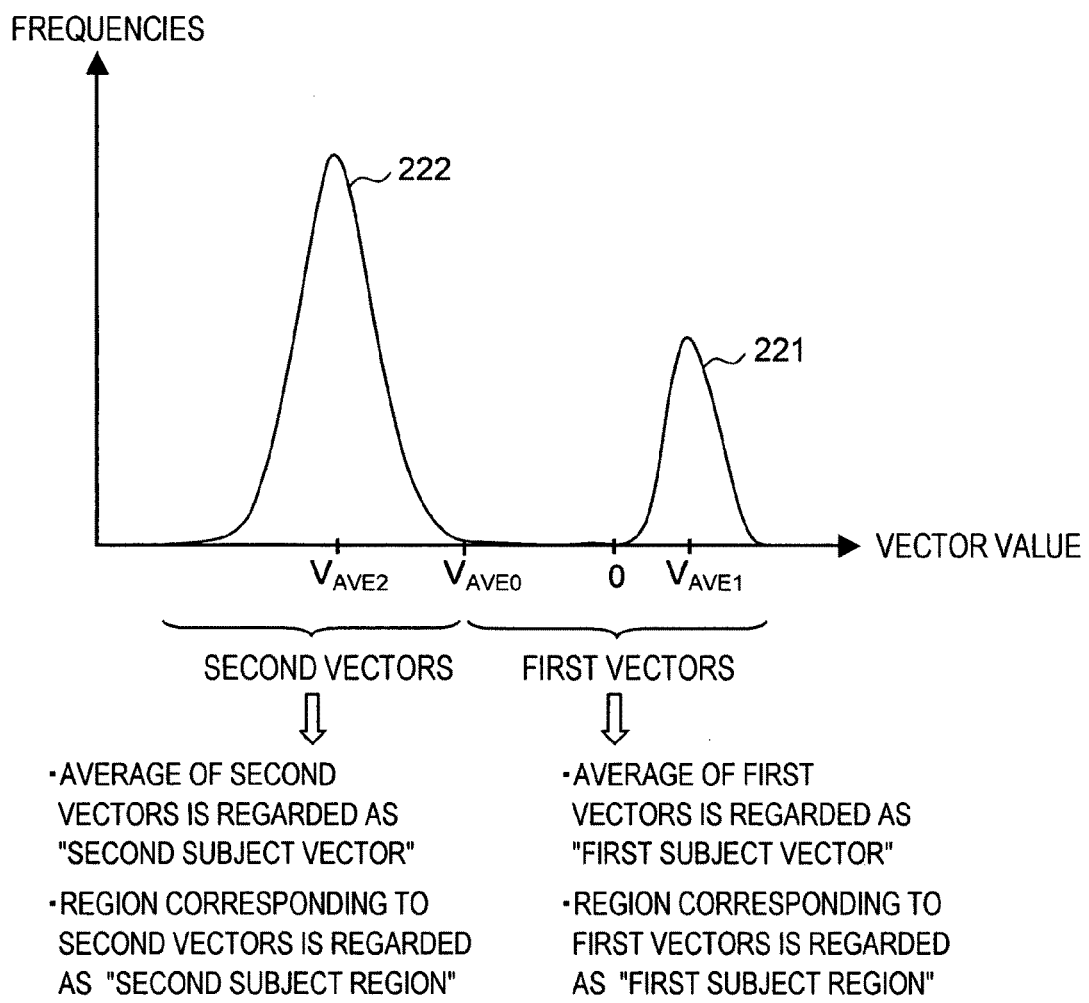
FIG. 21 is a diagram showing a histogram of the regional motion vector with respect to the picture image shown in FIG. 19.

Although the motion vector has two dimensional quantities, the regional motion vector is regarded as one dimensional quantity of a vector value noting only the left and right directions. It is supposed that a vector value of the regional motion vector in the right direction is positive while a vector value of the regional motion vector in the left direction is negative. It is supposed that an absolute value of the vector value of the noted regional motion vector indicates a magnitude of the noted regional motion vector. FIG. 21 shows a histogram of the regional motion vectors with respect to the picture image 210. In this histogram, the horizontal axis and the vertical axis indicate vector values and frequencies, respectively. The right direction of the horizontal axis corresponds to the positive direction of the vector value.

The histogram shown in FIG. 21 is divided into a distribution 221 of positive vector values and a distribution 222 of negative vector values. The distribution 221 corresponds to the regional motion vectors of the 14 split regions AR[i, j] described above, while the distribution 222 corresponds to the regional motion vectors of the 34 split regions AR[i, j] described above.

A vector value of an average vector of all regional motion vectors with respect to the picture image 210 is denoted by $V_{AVE0}$. In addition, among the all regional motion vectors, the regional motion vectors having vector values of $V_{AVE0}$ or larger is classified as first vectors, while the regional motion vectors having vector values smaller than $V_{AVE0}$ are classified as second vectors. In the case of this example, the regional motion vectors of the 14 split regions AR[i, j] described above are classified as first vectors, while the regional motion vectors of the 34 split regions AR[i, j] described above are classified as second vectors.

After that, an average vector of all first vectors is calculated to be a first subject vector, and an average vector of all second vectors is calculated to be a second subject vector. A vector value of the first subject vector is denoted by $V_{AVE1}$, and a vector value of the second subject vector is denoted by $V_{AVE2}$. Of course, "$V_{AVE2} < V_{AVE0} < V_{AVE1}$" holds.

In addition, a combined region of the above-mentioned 14 split regions AR[i, j] corresponding to the first vectors is regarded as the first subject region, and a combined region of the above-mentioned 34 split regions AR[i, j] corresponding to the second vectors is regarded as the second subject region. In FIG. 20 the region inside the thick frame line denoted by reference numeral 215 corresponds to the first subject region, and the region outside the thick frame line corresponds to the second subject region.

Figure 22:
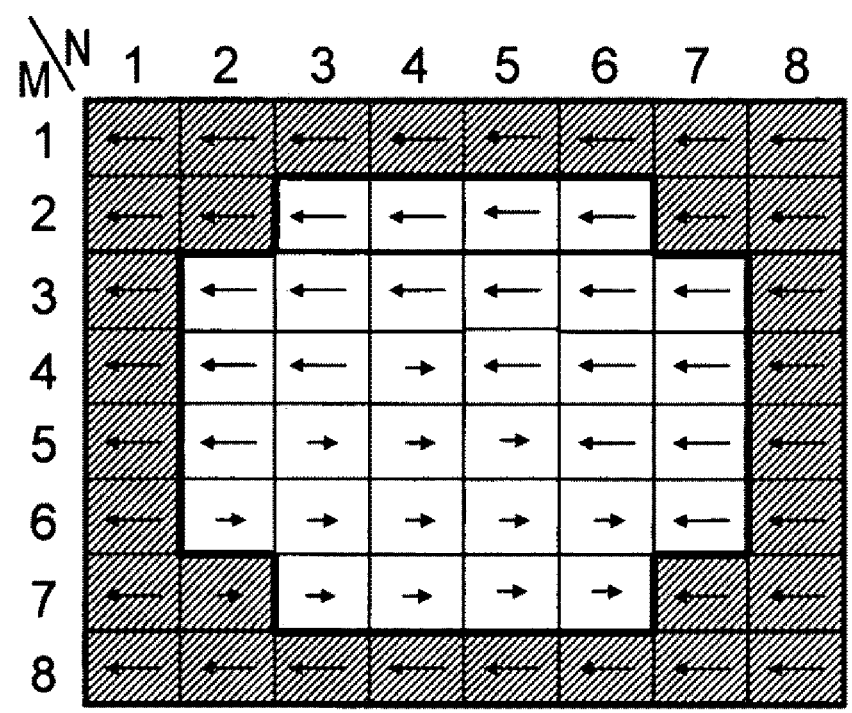
FIG. 22 is a diagram showing a peripheral region of the picture image according to the second embodiment of the present invention.

Then, the CPU 23 specifies one of the first and the second subject regions that exists more in the peripheral region of the picture image 210 as the background region and specifies the other region as the moving subject region. The peripheral region means, for example, the region with hatching in FIG. 22. More specifically, the combined region of the split regions AR[i, j] satisfying, for example, "i=1 and 1≦j≦8", or "i=8 and 1≦j≦8", or "1≦i≦8 and j=1", or "1≦i≦8 and j=8", or "i=2 and j=2", or "i=2 and j=7", or "i=7 and j=2", or "i=7 and j=7" is regarded as the peripheral region. It should be decided in advance which combined region of split regions is regarded as the peripheral region.

In the case of this example, 31 split regions AR[i, j] among total 32 split regions AR[i, j] that form the peripheral region belong to the second subject region, while the other one split region AR[i, j] (=AR[7, 2]) belong to the first subject region. In this case, since "31>1" holds, the CPU 23 specifies the second subject region as the background region and specifies the first subject region as the moving subject region. Then, it specifies the first subject vector corresponding to the first subject region specified as the moving subject region to be the "motion vector of the moving subject", while it specifies the second subject vector corresponding to the second subject region specified as the background region to be the "motion vector of the background".

In addition, it is possible to decide which one of the first and the second subject regions should be assigned to the moving subject region based on the magnitudes of the first and the second subject vectors. The magnitude of the first subject vector is expressed by an absolute value $|V_{AVE1}|$ of the vector value of the first subject vector, and the magnitude of the second subject vector is expressed by an absolute value $|V_{AVE2}|$ of the vector value of the second subject vector. Therefore, the absolute value $|V_{AVE1}|$ is compared with the absolute value $|V_{AVE2}|$, and a smaller one is regarded to correspond to the moving subject region.

For example, in the case of this example, since the photographer moves the cabinet of the imaging apparatus 1 so as to pursue the motorcycle, the magnitude of the motion vector of the motorcycle must be smaller than that of the background, i.e., "$|V_{AVE1}|<|V_{AVE2}|$" must hold. Therefore, in this case, the CPU 23 specifies the first subject region corresponding to the absolute value $|V_{AVE1}|$ as the moving subject region and specifies the second subject region corresponding to the absolute value $|V_{AVE2}|$ as the background region. Then, the first subject vector corresponding to the first subject region specified as the moving subject region is specified as the "motion vector of the moving subject", while the second subject vector corresponding to the second subject region specified as the background region is specified as the "motion vector of the background".

In addition, if the imaging apparatus 1 is equipped with a vibration sensor for detecting the movement of the cabinet of the imaging apparatus 1, it is possible to perform the decision which one of the first and the second subject regions should be assigned to the moving subject region based on a result of detection by the vibration sensor. The vibration sensor can be an angular velocity sensor for detecting angular velocity of the cabinet of the imaging apparatus 1 or an acceleration sensor for detecting acceleration of the cabinet. The CPU 23 converts a result of detection by the vibration sensor during the standby period into a motion vector on the picture image by using a focal length of the imaging portion 11 (this conversion method is known, so detailed description thereof is omitted). Then, the motion vector obtained by the conversion is compared with each of the first and the second subject vectors. One of the first and the second subject vectors that is more similar to the motion vector based on the result of detection by the vibration sensor is assumed to be the motion vector of the background.

For example, when the vector value of the motion vector based on the result of detection by the vibration sensor is denoted by $V_{SEN}$, an absolute value of a difference between the vector values $V_{SEN}$ and $V_{AVE1}$, as well as an absolute value of a difference between the vector values $V_{SEN}$ and $V_{AVE2}$ is calculated. Then, the region corresponding to the one having a larger absolute value is assigned to the moving subject region, while the region corresponding to the one having a smaller absolute value is assigned to the background region. In the case of this example, the vector values $V_{SEN}$ and $V_{AVE2}$ are substantially equal to each other, so "$|V_{SEN}-V_{AVE1}|>|V_{SEN}-V_{AVE2}|$" must hold. Therefore, the CPU 23 specifies the first subject region corresponding to $|V_{SEN}-V_{AVE1}|$ as the moving subject region and specifies the second subject region corresponding to $|V_{SEN}-V_{AVE2}|$ as the background region. Then, the first subject vector corresponding to the first subject region specified as the moving subject region is specified as the "motion vector of the moving subject", while the second subject vector corresponding to the second subject region specified as the background region is specified as the "motion vector of the background".

[Automatic Decision of the Follow Shot]

As described above in the first embodiment, the imaging modes of the imaging apparatus 1 include the normal shooting mode and the follow shot imaging mode. Furthermore, if the imaging mode of the imaging apparatus 1 is set to the follow shot imaging mode before the shutter button 26b is pressed, the imaging by the follow shot is performed via the above-mentioned process between the timings T11 and T14. In the second embodiment, it is supposed that the imaging modes of the imaging apparatus 1 further include an automatic switching mode. If the imaging mode of the imaging apparatus 1 is set to the automatic switching mode by the operation of the operating key 26c before the shutter button 26b is pressed, the imaging apparatus 1 decides automatically whether or not the photographer intends to perform the follow shot and performs control in accordance with a result of the decision. This decision is referred to as an automatic decision of the follow shot.

A method of the automatic decision of the follow shot will be described. This decision is performed based on the picture image obtained by the shooting in the standby period. As an example, the case where the decision is performed by noting the picture image 210 shown in FIG. 19 and based on the picture image 210 will be described. The CPU 23 checks a presence situation of the state moving subject region in a predetermined criteria region in the picture image 210 based on a position of the moving subject in the picture image 210 and the magnitude thereof, and it decides whether or not the photographer intends to perform the follow shot based on a result of the checking.

Figures 23A, 23B:
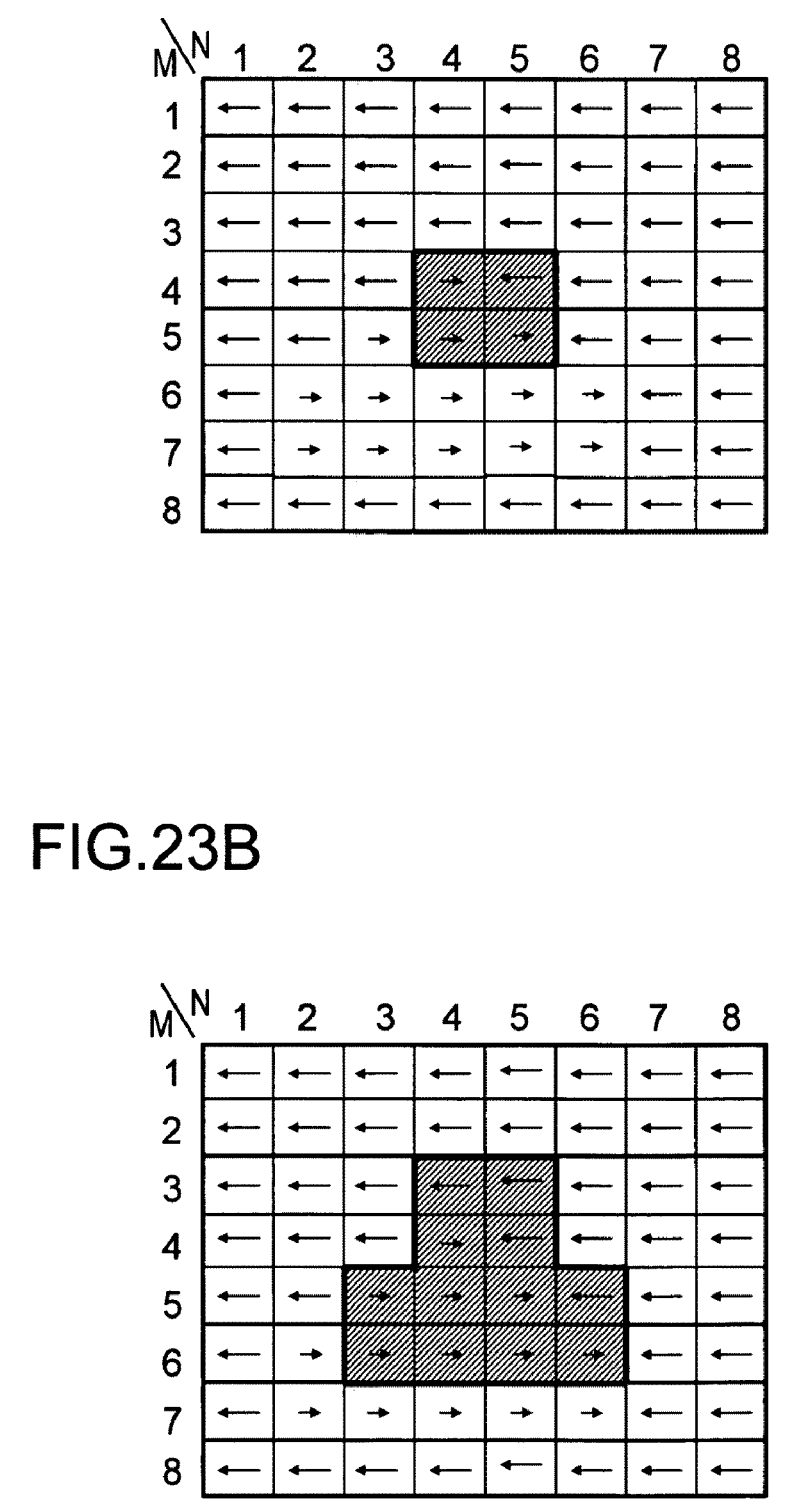

The criteria region is disposed at a vicinity of the middle in the picture image 210. For example, the criteria region is a combined region of total four split regions AR[i, j] where (i, j)=(4, 4), (4, 5), (5, 4) and (5, 5) like the region with hatching shown in FIG. 23A. After classifying the entire region of the picture image 210 into the moving subject region and the background region, the CPU 23 calculates a ratio of the moving subject region in the criteria region. In the case of the picture image 210, the ratio is 75%.

If the ratio is higher than or equal to a predetermined reference ratio (e.g., 50%), it is decided that the photographer intends to perform the follow shot. In this case, after the shutter button 26b is pressed fully, the above-mentioned period between the timings T13 and T14 is regarded as the follow shot exposure period (see FIG. 17), and the follow shot optical axis control is performed. In contrast, if the ratio is lower than the reference ratio, it is decided that the photographer intends other than the imaging by the follow shot. In this case, the shutter button 26b is pressed fully, and the normal shooting of a still picture is performed without performing the follow shot optical axis control.

If the photographer intends to perform the imaging by the follow shot, the photographer will usually try to pursue the moving subject in the state where the noted moving subject is positioned at the middle or vicinity thereof in the shoot area. Therefore, it is possible to estimate intention of the photographer by detecting whether or not the moving subject region exists in the middle portion or a vicinity thereof in the picture image as described above.

Note that the method of defining the criteria region can be modified variously. For example, it is possible to regard the combined region of total 12 split regions AR[i, j] positioned at the middle of a vicinity thereof in the picture image 210 to be the criteria region like the region with hatching shown in FIG. 23B.

[Exposure Condition of Imaging by Follow Shot]

Figure 24:
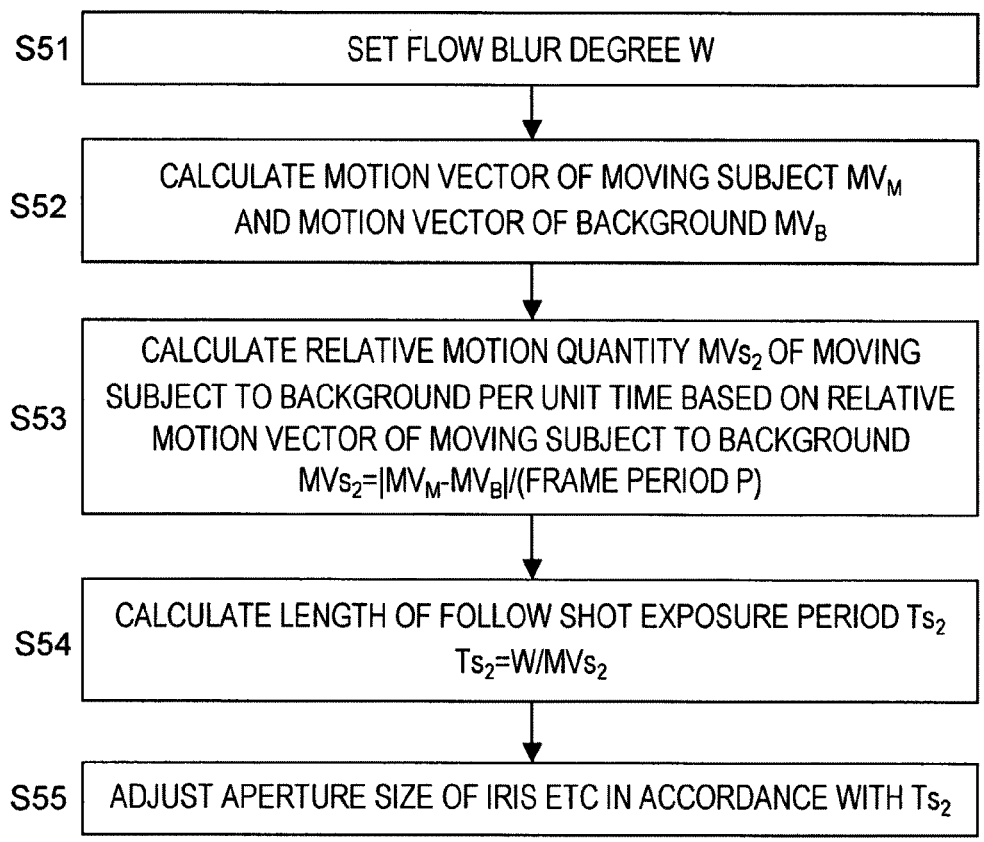
FIG. 24 is a flowchart showing a procedure of a process for setting exposure conditions or the like for obtaining the follow shot image according to the second embodiment of the present invention.

Next, a setting method of the exposure condition and the like for obtaining the follow shot image will be described. FIG. 24 is a flowchart showing a procedure of this setting method.

First, in the step S51, the flow blur degree W is set in advance prior to the imaging by the follow shot (see FIG. 13). As described above in the first embodiment, the flow blur degree W can be set freely by a predetermined operation of the operating key 26c.

In the next step S52, the motion vector of the moving subject and the motion vector of the background are calculated by using the method described above based on the picture image obtained in the standby period. The calculated motion vector of the moving subject and motion vector of the background are denoted by $MV_M$ and $MV_B$, respectively.

For example, the motion vectors $MV_M$ and $MV_B$ can be calculated from the regional motion vectors of a certain picture image in the standby period. The certain picture image is a picture image whose exposure period belongs to the standby period. If the picture image is the picture image 210 shown in FIG. 19, the motion vector of the moving subject and the motion vector of the background in the picture image 210 should be regarded as $MV_M$ and $MV_B$, respectively.

Alternatively, it is possible to calculate the motion vectors $MV_M$ and $MV_B$ from the regional motion vectors of a plurality of picture images in the standby period. In this case, for example, the motion vector of the moving subject and the motion vector of the background are determined with respect to each of the plurality of picture images. Then, an average vector of the motion vector of the moving subject with respect to the plurality of picture images is denoted by $MV_M$, while an average vector of the motion vector of the background with respect to the plurality of picture images is denoted by $MV_B$.

Figure 25:
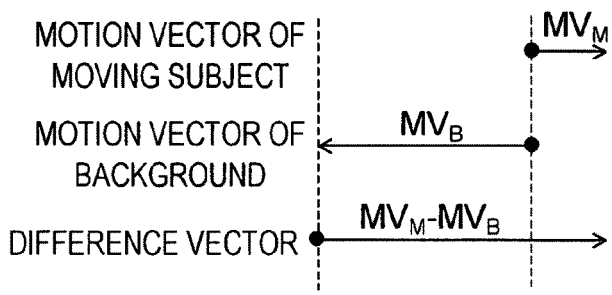
FIG. 25 is a diagram showing a relationship among the motion vector of the moving subject, the motion vector of the background and a difference vector between them according to the second embodiment of the present invention.

In the next step S53, the motion quantity $MVs_2$ of the moving subject on the image per unit time (i.e., per second) is calculated. Note that the motion quantity $MVs_2$ of the moving subject is relative motion quantity of the moving subject to the background. More specifically, a relative motion vector of the moving subject to the background is calculated first. This relative motion vector is a difference vector $(MV_M - MV_B)$ between the motion vector of the moving subject $MV_M$ and the motion vector of the background $MV_B$. FIG. 25 shows a relationship among these vectors. For example, if the direction of the motion vector of the moving subject $MV_M$ is the right direction and the magnitude thereof is two, and if the direction of the motion vector of the background $MV_B$ is the left direction and the magnitude thereof is ten, the direction of the difference vector $(MV_M - MV_B)$ and the magnitude thereof are the right direction and 12 (=2−(−10)).

After that, the motion quantity $MVs_2$ is calculated in accordance with the equation (3) below. Here, $|MV_M - MV_B|$ indicates the magnitude of the difference vector $(MV_M - MV_B)$, and P indicates the frame period in the standby period. Note that W and $|MV_M - MV_B|$ are defined by unit of pixel, for example.

$$MVs_2 = |MV_M - MV_B|/P \quad (3)$$

After the motion quantity $MVs_2$ is calculated, the length of the follow shot exposure period $Ts_2$ is calculated in accordance with the equation (4) below in the step S54.

$$Ts_2 = W/MVs_2 \quad (4)$$

Then in the step S55, the CPU 23 adjusts the aperture size of the iris 32 via the driver 34 in accordance with the length $Ts_2$, so that the follow shot image can be obtained with an appropriate exposure. If it does not reach an appropriate exposure even if the aperture size is set to the maximum value, the amplification degree of the signal amplification in the AFE 12 is adjusted so that the brightness of the follow shot image is increased to a desired brightness. In addition, if it is decided that the brightness of the follow shot image is too high even if the aperture size of the iris 32 is set to the minimum value and the amplification degree of the signal amplification in the AFE 12 is set to the minimum value, an ND (Neutral Density) filter (not shown) is inserted so that incident light quantity of the image sensor 33 is attenuated. Note that the computing process in the steps S52-S54 described above is performed by the CPU 23, for example.

[General Operation Flow of Imaging by Follow Shot]

Figure 26:
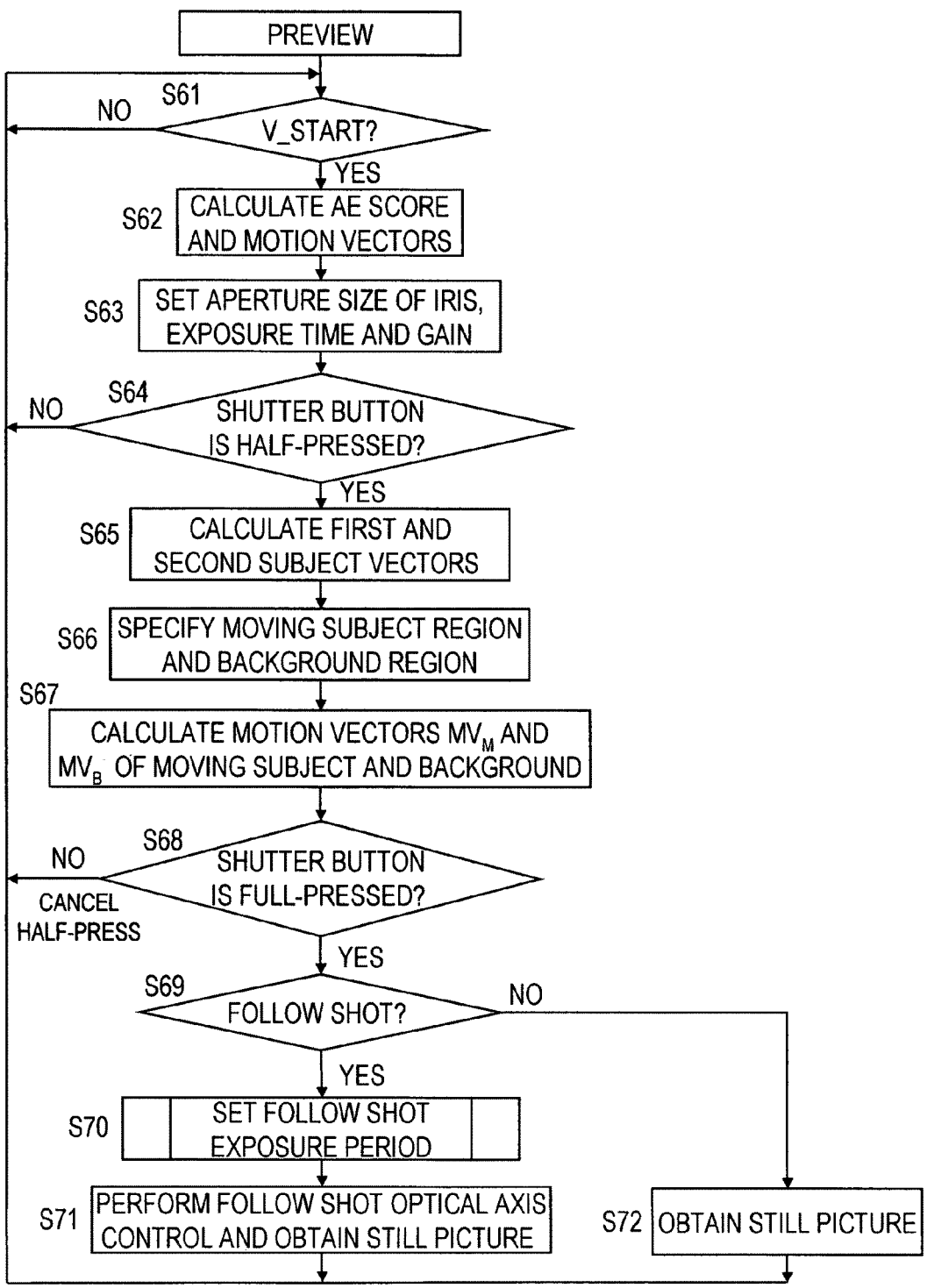
FIG. 26 is a flowchart showing an operational procedure of the imaging apparatus shown in FIG. 1 in the imaging mode in which the imaging by the follow shot is noted in particular according to the second embodiment of the present invention.

Next, noting the imaging by the follow shot in particular, an operation procedure of the imaging apparatus 1 in the imaging mode will be described. FIG. 26 is a flowchart showing this operation procedure. However, this flowchart shows an operation procedure in the automatic switching mode utilizing the automatic decision of the follow shot described above. If the automatic decision of the follow shot is not utilized (i.e., if the follow shot imaging mode is set as the operating mode of the imaging apparatus 1), the process of the steps S69 and S72 that will be described later is omitted. In this case, when the shutter button 26b becomes the full pressed state in the step S68, the process should go directly to the step S70.

When the automatic switching mode is set, the process goes to the preview period first, where so-called preview is performed. The period of repeating the loop process including the steps S61-S64 shown in FIG. 26 corresponds to the period before the timing T11 shown in FIG. 17.

In the step S61, it is checked whether or not the TG 22 shown in FIG. 1 has delivered the vertical synchronizing signal. The vertical synchronizing signal is generated and delivered at the start point of each frame. In synchronization with the vertical synchronizing signal, an output signal of the image sensor 33 is read out so that picture images are obtained sequentially. If the TG 22 has delivered the vertical synchronizing signal, the process goes to the step S62. If the vertical synchronizing signal is not delivered, the process of the step S61 is repeated.

In the step S62, the AE score is calculated with respect to the latest picture image, and each regional motion vector is calculated. In the step S63 following the step S62, the aperture size of the iris 32, the exposure time (length of the exposure period) and the amplification degree of the signal amplification in the AFE 12 (gain) are set based on the AE score. Then, the process goes to the step S64, where it is decided whether or not the shutter button 26b is in the half-pressed state. If the shutter button 26b is in the half-pressed state, the process goes from the step S64 to the step S65. Otherwise, the process goes back to the step S61. The timing when the process goes from the step S64 to the step S65 corresponds to the timing T11 shown in FIG. 17, and the period from this timing to the start timing of the follow shot exposure period is the standby period.

After going from the step S64 to the step S65, in accordance with the method described above, the first and the second subject vectors are calculated in the step S65, the moving subject region and the background region are specified in the step S66, the motion vectors $MV_M$ and $MV_B$ of the moving subject and the background are calculated in the step S67. After that, it is decided whether or not the shutter button 26b is transferred from the half-pressed state to the full-pressed state in the step S68. If it is transferred to the full-pressed state, the process goes from the step S68 to the step S69. On the other hand, if the operation force of pressing the shutter button 26b is cancelled so that the shutter button 26b is neither the half-pressed state nor the full-pressed state, the process goes back to the step S61.

In the step S69, the automatic decision of the follow shot described above is performed so as to decide whether or not the photographer intends to perform the follow shot based on the picture image obtained by the shooting in the standby period. If it is decided that the photographer intends to perform the follow shot, the process goes to the step S70. Otherwise, the process goes to the step S72.

In the step S70, the process of the step S53, S54 and S55 shown in FIG. 24 is performed. More specifically, the relative motion quantity $MVs_2$ of the moving subject is calculated based on the motion vectors $MV_M$ and $MV_B$ of the moving subject and the background calculate in the step S67, so that the length of the follow shot exposure period $Ts_2$ is set and the aperture size of the iris 32 is adjusted in accordance with $Ts_2$. In this case, the amplification degree of the signal amplification in the AFE 12 is also adjusted if necessary.

When the adjustment of the aperture size of the iris 32 is finished, the follow shot optical axis control is performed based on the motion vector of the moving subject $MV_M$, while the still picture is shot by the exposure time $Ts_2$ so as to obtain the follow shot image in the step S71. More specifically, it is supposed that if the follow shot optical axis control is not performed, the moving subject continues the movement expressed by the motion vector $MV_M$ on the image sensor 33. Then, in order to cancel the supposed movement, the correcting lens 36 is moved in the optical system 35 during the real follow shot exposure period. The movement of the moving subject on the image sensor 33 expressed by the motion vector $MV_M$ is caused from the movement of the moving subject in the real space and the movement of the cabinet of the imaging apparatus 1. The follow shot image obtained by the shooting in the step S71 is recorded on the memory card 18 via the compression processing portion 16 shown in FIG. 1.

On the other hand, if the process goes from the step S69 to the step S72, the normal shooting of a still picture is performed without performing the follow shot optical axis control. The image obtained here is also recorded on the memory card 18 via the compression processing portion 16. After the step S71 or S72 is finished, the process goes back to the step S61.

The follow shot image obtained by the process described above includes a clear image of the motorcycle as the moving subject shown in FIG. 13, while the background portion causes a desired flow blur degree W. Therefore, even if the operation of the imaging apparatus 1 by the photographer (panning operation or tilting operation) is not sufficient, it is possible to obtain a good imaging effect of the follow shot.

In addition, when the imaging mode is set to the automatic switching mode, it is decided automatically whether or not the photographer intends to perform the follow shot so that the control in accordance with the photographer's intention is performed automatically for convenience.

As described above as Note 1 in the first embodiment, the correcting lens 36 can be also used as an optical element for so-called vibration correction. In addition, similarly to the above description as Note 2 in the first embodiment, the correcting lens 36 may be replaced with the variangle prism 36a (see FIG. 16). In this case, the refraction direction variangle prism 36a should be controlled, during the follow shot exposure period, so as to cancel the movement of the moving subject on the image sensor 33 due to the movement of the moving subject in the real space and the movement of the cabinet of the imaging apparatus 1, based on the motion vector of the moving subject $MV_M$ during the standby period.

In addition, similarly to the above description as Note 3 in the first embodiment, the function of canceling the movement may be realized by the movement of the image sensor 33 in the two-dimensional direction (two-dimensional direction perpendicular to the optical axis).

Hereinafter, variations and annotations in the first and/or the second embodiment will be described.

Concrete values indicated in the above description are merely examples and can be changed to various values of course.

In addition, the imaging apparatus 1 shown in FIG. 1 can be realized by hardware or a combination of hardware and software. In particular, the computing process necessary for performing the imaging by the follow shot described above can be realized by software or a combination of hardware and software.

If the imaging apparatus 1 is realized by using software, the block diagram of individual portions realized by the software shows a functional block diagram showing the individual portions. A whole or a part of the computing process necessary for performing the imaging by the follow shot described above may be described as a program, which is performed on a program executing device (e.g., a computer), so that the whole or the part of the computing process is realized.

In FIG. 2 or 16, the correcting lens 36 or the variangle prism 36a works an image moving portion for moving the optical image projected to the image sensor 33 on the image sensor 33. It is possible to consider that the image moving portion includes the driver 34 for driving the correcting lens 36 or the driver (not shown) for driving the variangle prism 36a. In addition, if the imaging by the follow shot is performed by moving the image sensor 33 as described above, the actuator for driving the image sensor 33 works as the image moving portion. In addition, it is possible to consider that the control portion that performs the follow shot optical axis control described above is realized mainly by the CPU 23, and that the control portion is included in the CPU 23, for example. In addition, the automatic decision of the follow shot according to the second embodiment is performed by an image movement control permission deciding portion included in the CPU 23.

What is claimed is:

1. An imaging apparatus comprising: an image sensor which outputs a picture image according to an optical image projected to the image sensor through an optical system; an image moving portion which moves the optical image on the image sensor; a motion detecting portion which detects movement information on the picture image from the image sensor and which detects a movement on the picture image of a moving subject that appears in the optical image; and a control portion which performs image movement control, wherein in the image movement control, the control portion controls the image moving portion in such a direction as to cancel a movement of the moving subject on the image sensor due to a movement of the moving subject in a real space, based on a movement of the moving subject detected in advance, the image movement control is inhibited from being performed when a predetermined condition is satisfied, wherein the motion detecting portion calculates a plurality of regional motion vectors one for each of a plurality of split regions within the picture image from the image sensor to detect the plurality of regional motion vectors as the movement information, the control portion compares each of the regional motion vectors with an average vector of the regional motion vectors, and whether or not the predetermined condition is satisfied is decided based on a result of the comparison by the control portion.

2. The imaging apparatus according to claim 1, wherein the image movement control is inhibited from being performed when the imaging apparatus is decided to be panned or tilted based on the movement information detected.

3. An imaging control method that is used in an imaging apparatus having an image sensor which outputs a picture image according to an optical image projected to the image sensor through an optical system, and an image moving portion which moves the optical image on the image sensor, the method comprising:

a motion detecting step for detecting movement information on the picture image from the image sensor and detecting a movement on the picture image of a moving subject that appears in the optical image; and a controlling step for performing image movement control, wherein in the image movement control, the controlling step controls the image moving portion in such a direction as to cancel a movement of the moving subject on the image sensor due to a movement of the moving subject in a real space, based on a movement of the moving subject detected in advance, the image movement control is inhibited from being performed when a predetermined condition is satisfied, wherein the motion detecting step includes calculating a plurality of regional motion vectors one for each of a plurality of split regions within the picture image from the image sensor to detect the plurality of regional motion vectors as the movement information, the controlling step includes comparing each of the regional motion vectors with an average vector of the regional motion vectors, and whether or not the predetermined condition is satisfied is decided based on a result of the comparison by the controlling step.

4. The imaging control method according to claim 3, wherein the image movement control is inhibited from being performed when the imaging apparatus is decided to be panned or tilted based on the movement information detected.

* * * * *